(12) United States Patent
Kosaka et al.

(10) Patent No.: US 8,886,017 B2
(45) Date of Patent: Nov. 11, 2014

(54) DISPLAY IMAGE GENERATING METHOD

(75) Inventors: Junichi Kosaka, Tokyo (JP); Hideshi Yamada, Kanagawa (JP)

(73) Assignees: Sony Corporation, Tokyo (JP); Sony Mobile Communications Japan, Inc., Tokyo (JP)

( * ) Notice: Subject to any disclaimer, the term of this patent is extended or adjusted under 35 U.S.C. 154(b) by 0 days.

(21) Appl. No.: 13/450,962

(22) Filed: Apr. 19, 2012

(65) Prior Publication Data
US 2012/0294583 A1 Nov. 22, 2012

Related U.S. Application Data

(60) Provisional application No. 61/486,444, filed on May 16, 2011.

(51) Int. Cl.
*G11B 27/00* (2006.01)
*H04N 5/93* (2006.01)
*H04N 9/80* (2006.01)
*H04N 5/77* (2006.01)
*G06T 3/40* (2006.01)
*G06T 13/80* (2011.01)

(52) U.S. Cl.
CPC .............. *G06T 13/80* (2013.01); *G06T 3/4038* (2013.01)
USPC ........... 386/278; 386/224; 386/239; 386/241; 386/248

(58) Field of Classification Search
USPC .................................. 386/239–248, 278–290
See application file for complete search history.

(56) References Cited

U.S. PATENT DOCUMENTS

| | | | |
|---|---|---|---|
| 5,969,716 A * | 10/1999 | Davis et al. ................... 715/726 | |
| 6,323,856 B1 | 11/2001 | Smilansky et al. | |
| 6,636,220 B1 | 10/2003 | Szeliski et al. | |
| 6,751,405 B1 | 6/2004 | Hasegawa | |
| 7,012,623 B1 * | 3/2006 | Kusama et al. ................ 345/634 |
| 8,027,565 B2 * | 9/2011 | Zhang ........................... 386/241 |
| 2003/0031257 A1 * | 2/2003 | Yoshida et al. .......... 375/240.16 |
| 2006/0018547 A1 * | 1/2006 | Ouchi ........................... 382/190 |

OTHER PUBLICATIONS

Extended European Search Report Issued Aug. 13, 2012 in Patent Application No. 12167715.7.
Aseem Agarwala, et al.; "Panamoric Video Textures", Copyright 2005 by the Associateion ofro Computing Machinery, Inc., pp. 821-827.
Office Action issued Apr. 11, 2014 in European Patent Application No. 12 167 715.7.
Chinese Office Action issued Jun. 5, 2014 in Chinese Application No. 201210149700.8 with English translation, 17 pages.

* cited by examiner

*Primary Examiner* — Hung Dang
(74) *Attorney, Agent, or Firm* — Oblon, Spivak, McClelland, Maier & Neustadt, L.L.P.

(57) ABSTRACT

An image processing apparatus including an input terminal that receives a plurality of image units that are temporally or spatially continuous; an image processing unit that performs image processing on the plurality of image units by iteratively performing the image processing on subsets of the plurality of image units; and a display image generating unit that controls a display to display the plurality of image units when the image processing unit begins performing the image processing; display, at a time of a completion of intermediate processing of a subset of the plurality of image units by the image processing unit, an intermediate processed image including the processed subset of the plurality of image data units; and display, after completion of the processing of the plurality of image units by the image processing unit, a complete processed image including the processed plurality of image data units.

20 Claims, 27 Drawing Sheets (A)  (B)  (C)

DISPLAY IMAGE GENERATING METHOD

CROSS REFERENCE TO RELATED APPLICATION

The present application claims the benefit of the earlier filing date of U.S. Provisional Patent Application Ser. No. 61/486,444 filed on May 16, 2011, the entire contents of which is incorporated herein by reference.

BACKGROUND

1. Field of the Disclosure

The present disclosure relates to a display image generating method for creating and displaying a repeated playback moving image where a several-second moving image is repeatedly played, for example.

2. Description of Related Art

For example, in the event that a first frame and a rear-most frame of multiple frames making up a several-second moving image having a motion are connected so as to be repeatedly played and displayed, the motion of a display object moving within a screen is temporarily disconnected at a connected portion between the first frame and the rear-most frame for example, which frequently prevents the moving image from being smoothly played. Specifically, for example, in the event of repeatedly playing and displaying a several-second moving image in which a scene where ripples come near, and a scene where the leaves of a tree are dancing in the wind were taken, the motions of the ripples and the dancing of the leaves of a tree are momentarily disconnected. Accordingly, a user who is viewing this moving image being repeatedly played and displayed feels the momentarily disconnected portion as an uncomfortable feeling.

Therefore, with a loop moving image generating method, for example, a pair of frame images temporally separated and also having the highest similarity are detected from frame images of an input video, this pair is connected by blending (mixing) so as not to visually expose difference between the frame images detected as this pair, whereby a visually smooth connected portion can be realized.

SUMMARY

Incidentally, in recent years, personal digital assistants on which a display panel which can display a vibrant image with high resolution is mounted and also in which a camera device which can take a moving image with high resolution is housed are coming into widespread use. With this personal digital assistant, there has grown a need to generate a repeated moving image from a moving image taken by a built-in camera device such that a several-second moving image is repeatedly played and displayed as described above, and to display the repeated moving image on the screen of the display panel, for example.

However, the processing capacities of the personal digital assistants is inferior to those of personal computers or the like, and accordingly, for example, in the event of extracting a several-second moving image from a taken moving image as described above, and generating a repeated moving image, a certain degree of long processing time is needed. Therefore, for example, even when intending to view a repeated moving image immediately after taking an image (generally in real time), the user is forced to wait until generation processing of this repeated moving image is completed.

Therefore, even with a device of which the processing capacity is somewhat low, in the event that a repeated moving image is generated and displayed from a several-second moving image having a motion obtained by taking an image or the like, the inventor recognizes necessity to enable display of the repeated moving image generally in real time since start of generation of the repeated image.

According to a first embodiment, the disclosure is directed to an image processing apparatus including an input terminal that receives a plurality of image units that are temporally or spatially continuous; an image processing unit that performs image processing on the plurality of image units by iteratively performing the image processing on subsets of the plurality of image units; and a display image generating unit that controls a display to display the plurality of image units when the image processing unit begins performing the image processing; display, at a time of a completion of intermediate processing of a subset of the plurality of image units by the image processing unit, an intermediate processed image including the processed subset of the plurality of image data units; and display, after completion of the processing of the plurality of image units by the image processing unit, a complete processed image including the processed plurality of image data units.

According to another exemplary embodiment, the disclosure is directed to an image display method performed by an information processing apparatus. The method includes receiving, at an input terminal of the information processing apparatus, a plurality of image units that are temporally or spatially continuous; performing image processing on the plurality of image units by iteratively performing the image processing on subsets of the plurality of image units; displaying, by a display of the information processing apparatus, the plurality of image units upon beginning the image processing on the plurality of image units; displaying, by the display, at a time of a completion of intermediate processing of a subset of the plurality of image units, an intermediate processed image including the processed subset of the plurality of image data units; and displaying, by the display, after completion of the image processing of the plurality of image units, a complete processed image including the processed plurality of image data units.

According to another exemplary embodiment, the disclosure is directed to a non-transitory computer-readable medium including computer program instructions, which when executed by an information processing apparatus, cause the information processing apparatus to perform a method comprising: receiving a plurality of image units that are temporally or spatially continuous; performing image processing on the plurality of image units by iteratively performing the image processing on subsets of the plurality of image units; displaying the plurality of image units upon beginning the image processing on the plurality of image units; displaying, at a time of a completion of intermediate processing of a subset of the plurality of image units, an intermediate processed image including the processed subset of the plurality of image data units; and displaying, after completion of the image processing of the plurality of image units, a complete processed image including the processed plurality of image data units.

Thus, according an embodiment of the present disclosure, even with a device of which the processing capacity is somewhat low, an image can continuously be displayed generally in real time since start of generation a group of processed images. Also, according to an embodiment of the present disclosure, an intermediate image generated in generating process of a group of processed images is displayed, thereby allowing the user to view images until a group of processed images are generated for amusing him/her.

DETAILED DESCRIPTION

Figure 1:
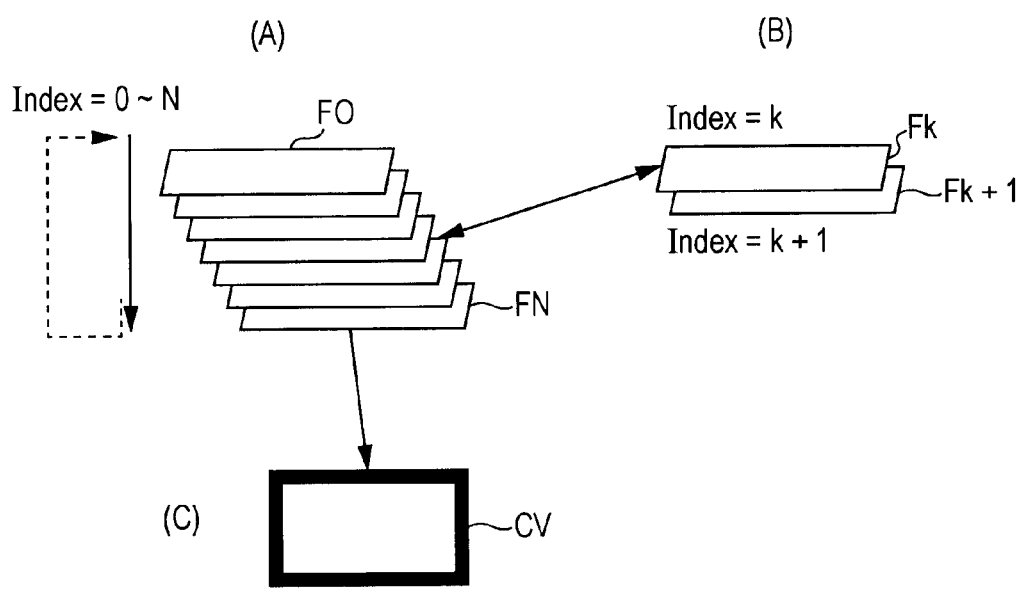
FIG. 1 is a diagram used for brief description regarding generation of a repeated moving image and display thereof according to an embodiment of the present disclosure.

An embodiment to which a display image generating method of the present disclosure has been applied will be described below with reference to the drawings.

Overview of Present Embodiment

First, an overview of the present embodiment of the present disclosure will be described.

A display processing device to which a display image generating method according to the present embodiment is applied may be applied to, as an example, a personal digital assistant on which a display panel whereby a brilliant image with high resolution can be displayed is mounted, and in which a camera unit whereby a moving image with high resolution can be taken is housed, or the like. With the following embodiment, description will be made with a personal digital assistant taken as an example.

The personal digital assistant according to the present embodiment is configured to receive a plurality of image data that temporally and/or spatially continue, to generate a group of processed images temporally and/or spatially connected from the received plurality of image data that temporally and/or spatially continue, to display the received temporally and/or spatially continuous plurality of image data on a screen at the time of starting generation of the group of processed images by the image processing unit, to continuously display, at the time of an intermediate processed image being generated during generation process of the group of processed images by the image processing unit, this intermediate processed image on a screen, and to continuously display, after generation of the group of processed images by the image processing unit is completed, the group of processed images after completion of this generation on the screen.

For example, in the event that the received plurality of image data is video data, the personal digital assistant according to the present embodiment generates a repeated moving image wherein a several-second moving image clipped from the video data thereof is repeatedly played, and the repeated moving image thereof can be displayed on the screen of the display panel (hereafter, written as display screen as appropriate). It also goes without saying that the personal digital assistant according to the present embodiment is not restricted to a taken moving image, and also, for example, an arrangement may be made wherein the several-second moving image is clipped from a moving image obtained from various networks or various storage devices, and a repeated moving image is generated and displayed from the moving image thereof. Note that, with the following description, a several-second moving image clipped from the taken moving image or a moving image via a network or the like, and used for generation of the repeated moving image will be represented as the original moving image.

Also, with the present embodiment, display of the repeated moving image is started generally in real time since, for example, at the time point of an instruction input for start of display of a repeated moving image being input from the user, or at the time point of a predetermined automatic display start condition set to the personal digital assistant beforehand being satisfied. Note that the time point of a predetermined automatic display start condition set to the personal digital assistant beforehand being satisfied can be conceived as when a specific point-in-time come, when a particular application was activated, when particular processing was started by some sort of application, or the like, as an example. It goes without saying that these are an example, and the present embodiment is not restricted to these. With the following description, the time point of an instruction input for start of display of a repeated moving image being input from the user, the time point of a predetermined automatic display start condition set to the personal digital assistant beforehand being satisfied, and so forth will not be distinguished in particular, and will be represented as repeated moving image display start time point.

The personal digital assistant according to the present embodiment sequentially displays, at the repeated moving image display start time point, frames making up the original moving image from the first frame, and connects the first frame to the next of the rear-most frame, thereby displaying a repeated image. Specifically, for example, as shown in (A) in FIG. 1, the personal digital assistant according to the present embodiment sequentially displays, at the repeated moving image display start time point, the frames F0 through FN making up the original moving image from the start, and connects the first frame F0 to the next of the rear-most frame FN, thereby displaying a repeated image.

Also, the personal digital assistant according to the present embodiment executes later-described loop moving image generation processing as to the original moving image as processing in the background while displaying a repeated moving image using the original moving image since the repeated moving image display start time point. With the present embodiment, the loop moving image generation processing is processing for generating a smooth repeated moving image that visually has no uncomfortable feeling as viewed from the user, and is made up of, for example, position adjustment processing, optimal repeated section detection processing, looping processing, blending processing, or the like. Also, examples of the position adjustment processing include motion detection processing, and shaking correction processing. Note that whether to perform the motion detection processing or shaking correction processing included in the position adjustment processing is controlled according to the content of the original moving image serving as the source as appropriate. Specifically, for example, in the event that the original moving image is a taken moving image, the position adjustment processing is controlled as appropriate to execute the shaking correction processing when a shaking component is included in the moving image thereof, and not to execute the shaking correction processing when a shaking component is not included. Also, the frames used at the time of the loop moving image generation processing may include a frame obtained by any one of the processes being executed as well as a frame making up the original moving image.

Also, upon a frame that has become displayable during execution of each process of the loop moving image generation processing, or a frame that has become displayable according to completion of each process being generated, the personal digital assistant according to the present embodiment successively replaces the frame thereof with a frame corresponding in a display-temporally manner within the repeated moving image. Specifically, for example, as shown in (B) and (A) in FIG. 1, upon frames Fk, Fk+1, and so forth that have become displayable during execution of each process, or according to completion of each process while executing the loop moving image generation processing as image synthesizing processing thread being generated, the personal digital assistant according to the present embodiment successively replaces these frames Fk, Fk+1, and so forth with a frame corresponding in a display-temporally manner within the repeated moving image of the repeated display thread. Note that, in the event that there is no frame corresponding in a display-temporally manner within the repeated moving image, a frame according to the loop moving image generation processing may be added, or in the event that a frame unnecessary for the repeated moving image has been generated, this frame may be deleted. Also, all of the frames after completion of the loop moving image generation processing do not need to be the frames after the processing, and may include a frame of the original moving image serving as the source. In other words, the frames to be subjected to the loop moving image generation processing are frames that need processing for generating a smooth repeated moving image visually having no uncomfortable feeling as viewed from the user, and frames in a moving image portion visually having no uncomfortable feeling as viewed from the user are not subjected to the loop moving image generation processing, and the frames of the original moving image serving as the source are used without change.

With the personal digital assistant according to the present embodiment, the loop moving image generation processing is executed in parallel with display of the repeated moving image as described above, and accordingly, the repeated moving image to be displayed on the display screen gradually becomes a moving image of which the frames are gradually replaced with the frames during execution or after completion of each process during the loop moving image generation processing from the repeated moving image of the original moving image at the repeated moving image display start time point. Specifically, with the present embodiment, on the screen of the personal digital assistant, the repeated moving image made up of the original moving image is displayed at the repeated moving image display start time point, thereafter a repeated moving image of which the frames are gradually replaced with the frames during execution in the loop moving image processing being displayed, and upon the loop moving image generation processing being completed, a smooth repeated moving image visually having uncomfortable feeling as viewed from the user is displayed. Accordingly, in this case, the user who views the repeated moving image thereof can enjoy a situation where the repeated moving image made up of the original image at the repeated moving image display start time point is gradually changed to a moving image according to the loop moving image generation processing, and ultimately view a smooth repeated moving image after completion of the loop moving image generation processing.

Subsequently, the personal digital assistant according to the present embodiment stores the data of the repeated moving image after completion of the loop moving image generation processing in built-in memory or predetermined storage destination memory or the like, transmits to a desired network, or the like according to an instruction from the user or automatic setting, as shown in (C) in FIG. 1.

As described above, according to the personal digital assistant according to the present embodiment, the loop moving image generation processing is executed by distributing the processing according to background processing while displaying the repeated moving image using the original moving image since the repeated moving image display start time point to successively replace frames, or the like, whereby the repeated moving image can be displayed generally in real time since the repeated moving image display start time point by successively replacing frames. Also, according to the personal digital assistant according to the present embodiment, the user is allowed to view a situation where the repeated moving image is changed, and thus, the user can enjoy a situation where the image is gradually finished.

Also, according to the personal digital assistant according to the present embodiment, the repeated moving image after completion of the loop moving image generation processing is stored in memory or the like, whereby the user can optionally play and display the repeated moving image after that. Also, according to the personal digital assistant according to the present embodiment, the data of the repeated moving image can be provided or transferred to another device, whereby the other device which obtained the data of the repeated moving image can play and display this repeated moving image, or the like.

Loop Moving Image Generation Processing

Hereafter, the loop moving image generation processing will be described.

The loop moving image generation processing is, as described above, made up of the position adjustment processing, optimal repeated section detection processing, looping processing, and blending processing.

Position Adjustment Processing

In the event that the original moving image is a moving image obtained by taking an image using the built-in camera unit in a state in which the personal digital assistant is held in the hand, there is a high possibility that the moving image thereof will include a shaking component (image shaking component due to the camera being shaken). In this way, there is a high possibility that a shaking component of a moving image due to camera shaking at the time of taking an image, or the like, will not only give a visually uncomfortable feeling as to the user who views the moving image thereof, but also have an adverse affect on similarity calculation of frame images in later-performed optimal repeated section detection processing, for example.

Therefore, with the loop moving image generation processing according to the present embodiment, first, image processing for matching the positions of the frame images in a direction canceling out a shaking component of the original moving image is performed, and each process of the optimal repeated section detection processing and thereafter is performed as to the moving image after this position adjustment processing.

The position adjustment processing is processing for correcting a shaking component of the moving image due to, for example, shaking at the time of camera shooting, and is performed using a position adjustment calculation such that another frame image is subjected to projective transformation as to one reference frame image to match the positions. Note that as for the reference frame image, the first frame image of the original moving image may be used, or one frame image optionally selected may be used. A projective transformation matrix necessary for position adjustment is obtained by extracting feature points of a set of frame images, and calculating a projective transformation matrix such that the feature points of the set of frame images thereof are adapted.

As for feature points adapted to such a position adjustment calculation, so-called SIFT feature points may be employed. With regard to SIFT feature points, details are described in, for example, "Brown, M. and Lowe, D. G. 2003. "Recognising Panoramas.", In Proceedings of the Ninth IEEE international Conference on Computer Vision—Volume 2 (Oct. 13-16, 2003). ICCV. IEEE Computer Society, Washington, D.C., 1218." or the like, and accordingly, detailed description thereof will be omitted here.

The feature points are for obtaining the position of a point having reproducibility even when the point of view changes, and the feature amount thereof, and obtaining positional relationship of the two frame images by calculating the corresponding relationship between the feature points from this feature amount and the positional information. Which feature point of the other frame image a feature point of one frame image corresponds to is obtained by Euclidean distance between the feature amounts. Further, with the position adjustment calculation, a small number of feature point correspondence pairs are selected by the so-called RANSAC method, a transformation matrix best adapted to transformation of the positions between the two feature points is calculated. Thus, a transformation matrix can correctly be obtained even when an error is included in the positions and correspondence relationship of the feature points by the RANSAC method. How to apply the RANSAC method is described in detail in the above-mentioned literature. As for the type of the transformation matrix, it is common to use a projective transformation matrix, but an affine transformation matrix or rigid transformation matrix which differs in flexibility of transformation may be used. However, as a result of a frame image being deformed by the projective transformation, there is a possibility that a place where a transformed frame image is not overlapped will occur on the edge and/or corner of the image. Therefore, with the position adjustment processing, crop processing is performed wherein the image in which a valid region where pixels are overlapped across the entirety of the video of the original moving image is remained is output. With this crop processing, all of the frame image groups subjected to the projective transformation are inspected, wherein a pixel position where a frame image is not overlapped is taken as invalid, the maximum rectangle including a valid pixel is calculated and taken as a crop region. All of the frame image groups are subject to the crop processing using this crop region. Note that the image is reduced in size by this crop processing, and accordingly, when intending to leave the original resolution, the crop processing may be skipped by setting black to blank space having no overlap, or the like.

Optimal Repeated Section Detection Processing

The optimal repeated section detection processing is processing for finding out a temporal position (frame position) optimal for repeated transition by comparing temporally separated frame images to calculate similarity, i.e., processing for detecting a frame image pair having the highest similarity.

Figure 2:
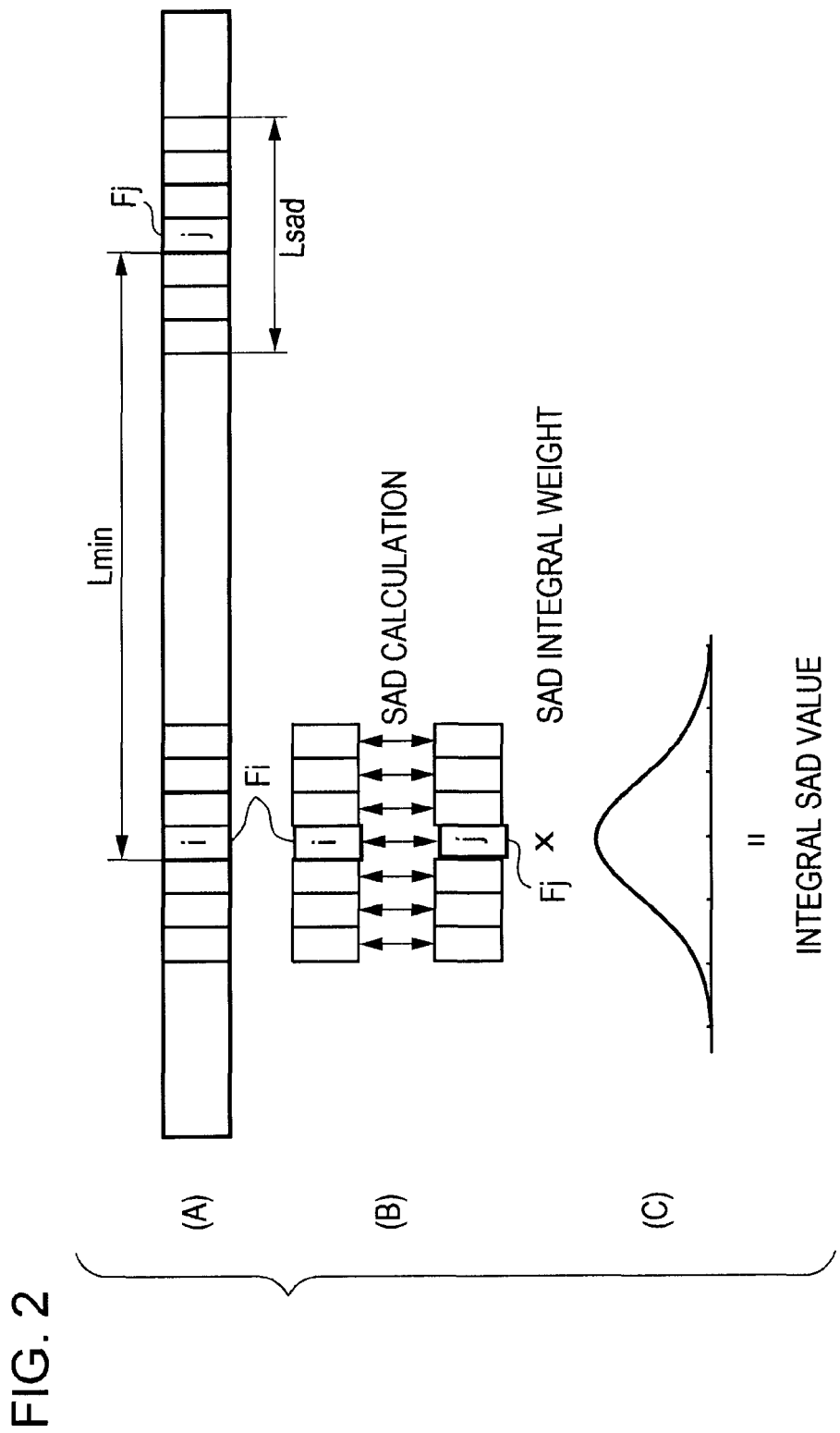
FIG. 2 is a diagram used for brief description regarding optimal repeated section detection processing of loop moving image generation processing according to the present embodiment.

Here, with the optimal repeated section detection processing, as shown in (A) and (B) in FIG. 2, the absolute value of difference between the luminance value of each pixel of a certain frame image Fi making up the original moving image, and the luminance value of corresponding each pixel of another frame image Fj is obtained regarding all the pixels within these frame images, and sum of the absolute values of the differences of all the pixels is obtained as an evaluated value used for calculation of similarity of the frame images. Note that in order to prevent a repeated section from excessively being shortened, temporal distance between the frame image Fi and the frame image Fj at the time of obtaining the evaluated value is taken as distance equal to or greater than the shortest video output length Lmin determined beforehand in light of temporal distance that should be separated at the very least. That is to say, the frame images of a pair of which the temporal distance is shorter than the shortest video output length Lmin are excluded from objects to be evaluated. The shortest video output length Lmin may be specified as an input parameter as to a display image generating program for executing the repeated moving image generation display processing according to the present embodiment, or the program may calculate the shortest video output length Lmin as a ratio as to the entire length of the original moving image. Note that, with the following embodiment, the display image generating program will be represented as a repeated moving image generating program.

With the present embodiment, the sum of the difference absolute values will be referred to as a difference absolute sum, and this difference absolute value will be represented as an SAD (Sum of Absolute Difference). The SAD value is an evaluated value at the time of obtaining similarity between frame images, and in the event that this SAD value is small, the frame images are similar, or conversely, in the event that the SAD value is great, the frame images are not similar. That is to say, frame images of which the SAD values are small are high in similarity, and accordingly, it can be conceived that visually uncomfortable feeling is less (visual difference is less) even if these frame images are connected for example.

However, with only the SAD values of frame images, it is difficult to evaluate the motion of an object within the frame images. For example, in the event of a moving image in which the pendulum of a clock sways right and left, the pendulum of the clock within a frame image making up this moving image is the object, it is difficult to determine whether the pendulum serving as the object has swayed from the left side of the image or has swayed from the right side, based on only the SAD values of certain frame images. Accordingly, in this case, in the event that the frame images are connected based on the SAD values of the frame images being small, there is a possibility that the motion of the pendulum serving as the object will not continue.

Therefore, with the optimal repeated section detection processing according to the present embodiment, at the time of evaluating similarity using the SAD values, as shown in (B) in FIG. 2, with regard to the neighborhood several frames of each of the frame images serving as the object to be evaluated as well, the SAD values of these frame images are calculated, and further, as shown in (C) in FIG. 2, the SAD values of these are integrated with weight, thereby obtaining an integral SAD value. Note that it can optionally be set using a parameter regarding how far temporally away SAD values of the neighborhood frame images from the frame images serving as the object should be evaluated. With the present embodiment, SAD integral tap length Lsad as shown in (A) in FIG. 2 can be set as this parameter. That is to say, the SAD integral tap length Lsad serves as a parameter representing the number of the neighborhood frame images temporally separated back and forth with the frame images serving as the object to be evaluated as the center. Also, as for the weight, as shown in (C) in FIG. 2, weight is desirable so as to be gradually attenuated from the center, and normal distribution weight can be employed, for example. Upon similarity between the frame images being calculated in this way, temporally near frame images are small in change, and accordingly, the integral SAD value thereof becomes small. That is to say, it can be evaluated that the smaller the integral SAD value is, the higher similarity is between the frame images serving as the object to be evaluated, which includes the motion of an object within the images.

As described above, with the optimal repeated section detection processing according to the present embodiment, a temporal position (frame position) optimal for repeated transition within the original moving image, i.e., a frame image pair having high similarity can be detected instead of only comparison between the frame image Fi and frame image Fj by also adding the integral SAD values equivalent to the number of adjacent frames worth to the evaluation.

Looping Processing

Figure 3:
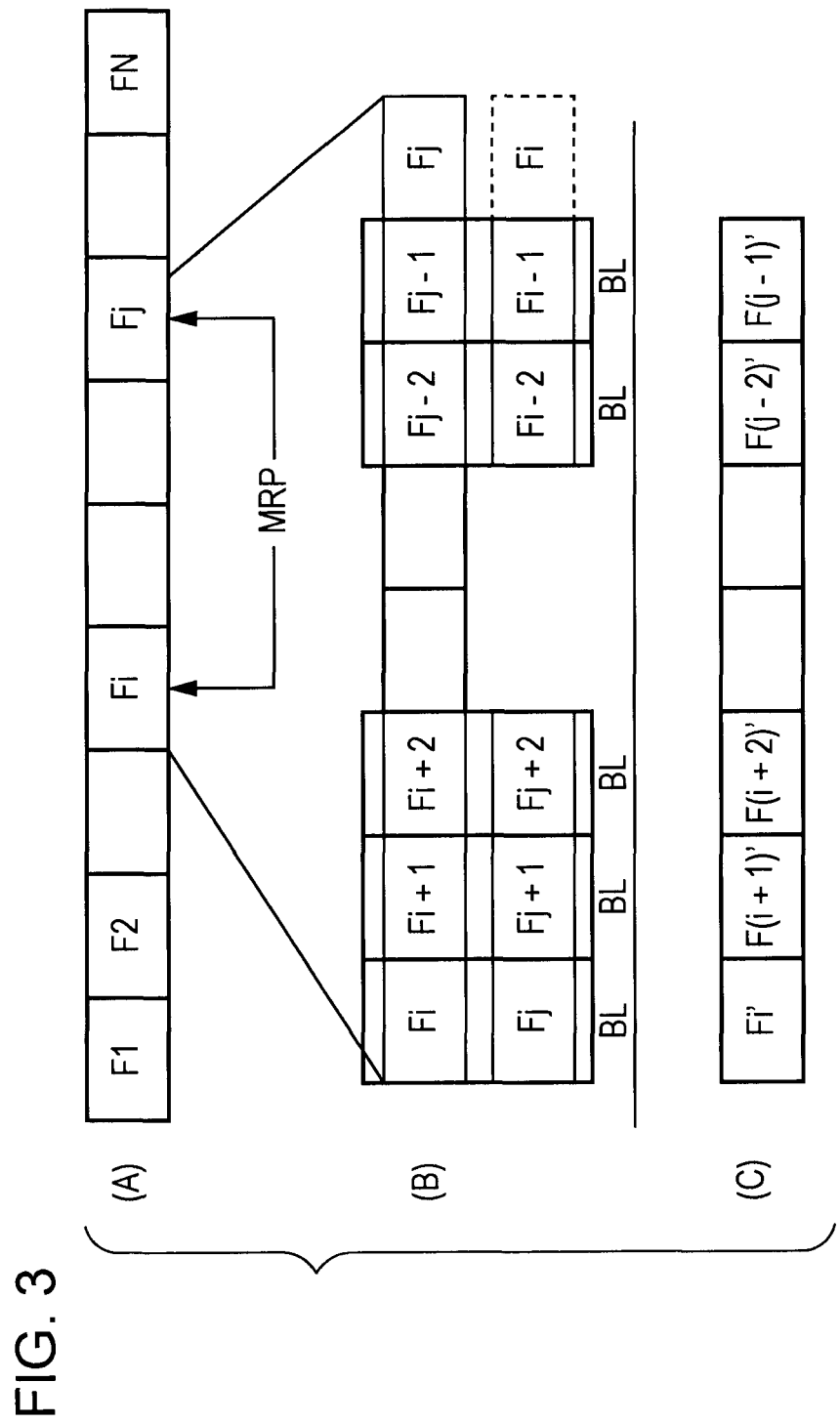
FIG. 3 is a diagram used for description of the frames of input video data, and the frames of a repeated moving image in the loop moving image generation processing according to the present embodiment.

The looping processing is processing wherein moving images are, as shown in (B) in FIG. 3, clipped and output between a pair MRP of a frame image Fi and a frame image Fj which are temporally separated and have high similarity as shown in (A) in FIG. 3, detected by the optimal repeated section detection processing, the first frame image (frame image Fi) and the rear-most frame image (frame image Fj) thereof are blended (mixed), and connected as shown in (C) in FIG. 3, thereby generating a loop moving image.

Blending Processing

The blending processing is processing for blending in the looping processing, and is processing wherein so as not to visually expose difference between both frame images of the temporally separated frame image Fi and frame image Fj, several frame images back and forth each of these frame image Fi and frame image Fj are changed while being blended (mixed), thereby realizing smooth connection of the moving image. Note that, with regard to frame images temporally distant from each of the frame image Fi and frame image Fj, the frame image data of the original moving image is output without change.

That is to say, even if frame images having high similarity are found so as to be connected as described above, both of the frame images do not match completely with a common moving image, and there is a high possibility that a connected portion will be visually exposed as viewed from the user. Therefore, with the blending processing according to the present embodiment, as a method for reducing visual exposure of the connected portion, cross fade processing is employed wherein several frame images back and forth each of a frame image i and a frame image j are blended while gradually changing the blending ratio, for example.

Schematic Diagram of Principal Portions of Personal Digital Assistant

Figure 4:
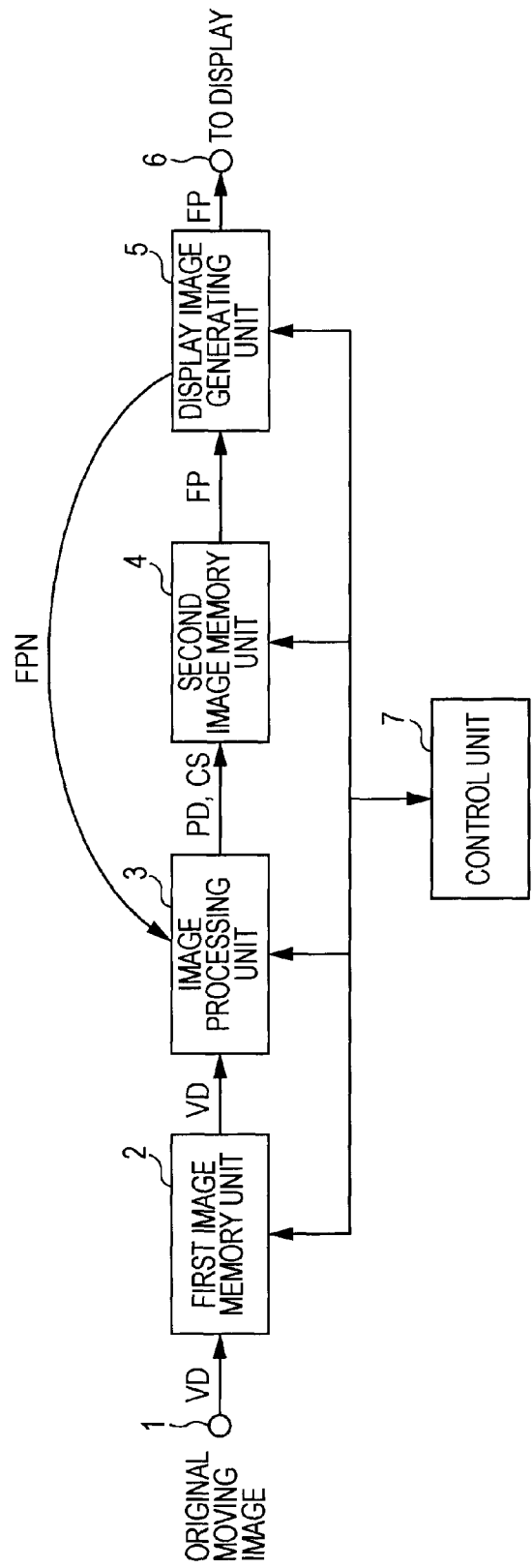
FIG. 4 is a functional block diagram illustrating the schematic configuration of principal portions according to the loop moving image generation processing at a personal digital assistant according to the present embodiment.

FIG. 4 illustrates the schematic configuration of principal portions of the personal digital assistant according to the present embodiment. Note that, with the configuration in FIG. 4, an image processing unit 3 and a display image generating unit 5 may be prepared as hardware, or may be configured as a calculation function unit within a CPU owing to execution of a repeated moving image generating program according to the present embodiment. Also, the repeated moving image generating program for the CPU or the like executing processing for generating a repeated moving image according to the present embodiment may be installed by being supplied to semiconductor memory or a disc-shaped recording medium, or the personal digital assistant according to the present embodiment via the Internet or a predetermined communication network, for example. This can also be applied to embodiments, which will be described hereafter.

In FIG. 4, video data VD imaged by a camera unit, or video data VD provided from a network or storage device as file data, or the like is supplied to an input terminal 1. Note that the video data VD supplied to this input terminal 1 is equivalent to the original moving image data. Also, the reception units of the video data VD at the input terminal 1 may be any units such as file units where the entirety of this video data VD is compiled, frame units, or scan line units. The video data VD supplied to the input terminal 1 is input to a first image memory unit 2.

After temporarily accumulating the video data VD, the first image memory unit 2 outputs this to the image processing unit 3 downstream under the writing/readout control of a control unit 7.

The image processing unit 3 has a configuration for executing the loop moving image generation processing. This image processing unit 3 executes, under the control of the control unit 7, the loop moving image generation processing as to the video data VD supplied from the first image memory unit 2. Upon processing in certain units being completed by execution of the loop moving image generation processing thereof, the image processing unit 3 outputs image data PD after the processing in the certain units and a completion signal CS indicating that the processing in the certain units has been completed to a second image memory unit 4. However, in the event that the processing in the certain units has not been completed in the loop moving image generation processing due to immediately after start of display of the repeated moving image, the image processing unit 3 reads out and outputs the original video data VD from the first image memory unit 2 for each of the certain units as the image data PD. Note that the certain units may be frame units, one block units within a frame, or any of file units in which the entire video data is compiled.

The second image memory unit 4 accumulates, under the writing/readout control of the control unit 7, the image data PD output from the image processing unit 3 upstream, and also outputs image data FP in frame units to the display image generating unit 5 downstream.

The display image generating unit 5 successively reads out, under the control of the control unit 7, the image data FP in frame units necessary for display indication from the second image memory unit 4, and outputs the frame image data FP thereof from an output terminal 6 to the display. Also, the display image generating unit 5 notifies (FPN) the image processing unit 3 of the temporal position of a frame displayed on the display at the current time point. Note that, with the present embodiment, after the loop moving image generation processing is started, a frame image to be displayed on the display before the whole of this loop moving image generation processing is completed will be represented as an intermediate image.

The image processing unit 3 which received the display frame position notification FPN from the display image generating unit 5 recognizes the display frame displayed on the display at the current time point using this display frame position notification FPN, and continues the loop moving image generation processing regarding frames other than that frame. Upon the processing in certain units being completed by execution of the loop moving image generation processing, the image processing unit 3 outputs the image data PD after the processing in the certain units thereof and the completion signal CS to the second image memory unit 4. Therefore, the second image memory unit 4 receives the image data PD other than the frame displayed on the display. Note that the second image memory unit 4 may have a double buffer configuration wherein in addition to a storage region for the frame to be displayed on the display, a storage region for the data to be processed at the image processing unit 3 is separately secured, and these storage regions are switched at processing end timing.

Figure 5:
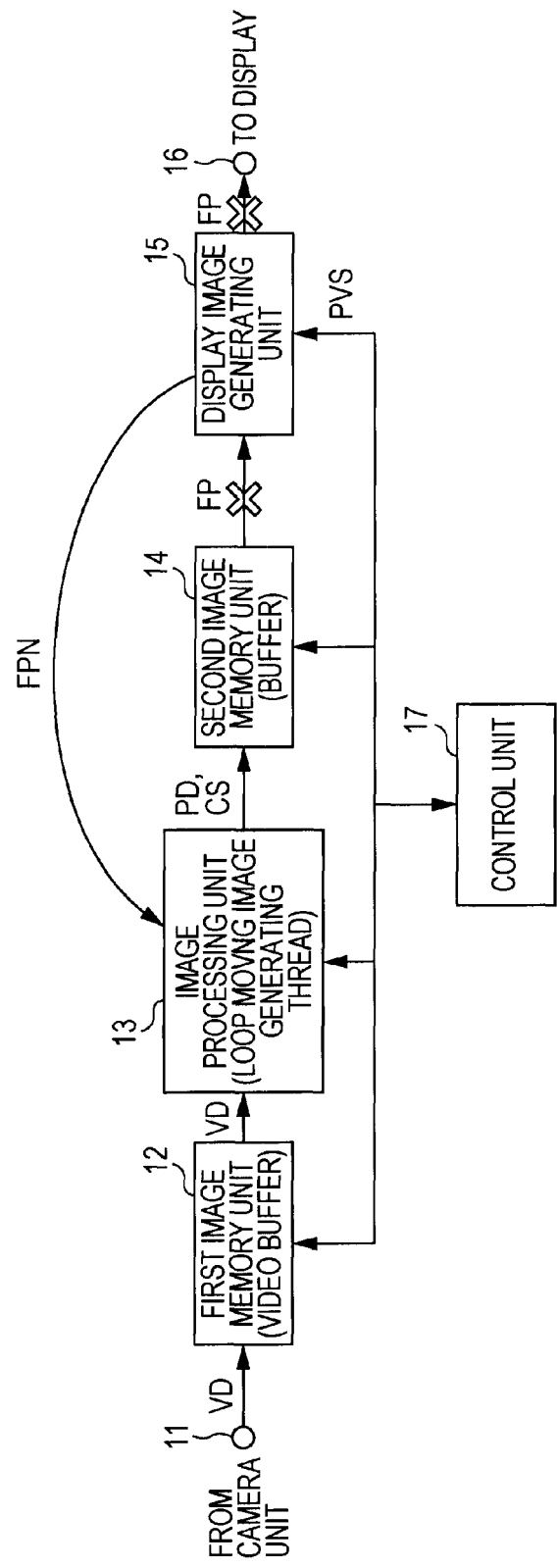
FIG. 5 is a functional block diagram illustrating the schematic configuration of principal portions according to the loop moving image generation processing for generating a repeated moving image made up of standby images according to the personal digital assistant according to the present embodiment.

Schematic Configuration of Personal Digital Assistant when Displaying Standby Background Moving Image FIG. 5 illustrates the schematic configuration of principal portions in the event that the personal digital assistant according to the present embodiment is a portable telephone terminal, when determining that a repeated moving image as described above is displayed as a standby background image to be displayed on the display screen of the portable telephone terminal thereof. Note that FIG. 5 illustrates an example wherein video data imaged by a built-in camera unit is used as the original moving image. Also, with the configuration in FIG. 5, an image processing unit 13 and a display image generating unit 15 may be prepared as hardware, or may be configured as a calculation function unit within a CPU owing to execution of the repeated moving image generating program according to the present embodiment.

In FIG. 5, video data VD imaged by the built-in camera unit is supplied to an input terminal unit 11. Note that the reception units of the video data VD at the input terminal 11 may be any units such as file units, frame units, scan line units, or the like in the same way as with the above-mentioned example in FIG. 4. The video data VD supplied to the input terminal 11 is input to a first image memory unit 12.

The first image memory unit 12 is a video buffer, temporarily accumulates the video data VD, and then outputs to the image processing unit 13 downstream under the writing/readout control of a control unit 17.

The image processing unit 13 has a configuration for executing the loop moving image generation processing, and performs the loop moving image generation processing regarding frames other than the display frame thereof under the control by the control unit 17 while recognizing the temporal position of the frame displayed on the display at the current time point by the display position notification FPN from the display image generating unit 15. Upon processing in certain units being completed by execution of the loop moving image generation processing as described above, the image processing unit 13 outputs image data PD after the processing in the certain units and the completion signal CS to a second image memory unit 14. Note that, with this example, in the event of changing the repeated section of the moving image, the image processing unit 13 will perform processing at timing when the display frame position is not a position not to be deleted in the loop moving image generation processing.

The second image memory unit 14 is buffer memory for frame images to be supplied to the display image generating unit 15, and accumulates, under the writing/readout control of the control unit 17, the image data PD output from the image processing unit 13 upstream, and also outputs image data FP in frame units to the display image generating unit 15 downstream.

The display image generating unit 15 successively reads out, under the control of the control unit 17, the image data FP in frame units necessary for display indication from the second image memory unit 14, and outputs the frame image data FP thereof from an output terminal 16 to the display. With the present embodiment, after the loop moving image generation processing is started, until the loop moving image generation processing is all completed, the frame image data FP of the intermediate image is output from the display image generating unit 15 to the display. Upon the loop moving image generation processing being all completed, the repeated image after this loop moving image generation processing is output from the display image generating unit 15 to the display.

However, in the event of the portable telephone terminal such as the present embodiment, according to execution of an application program other than for standby images, an image other than standby images may be displayed on the display screen or the display luminance of the display screen may be set to zero for power saving. Therefore, only in the event that the display luminance is not zero and also a standby image is displayed, the display image generating unit 15 displays the standby background moving image serving as the repeated moving image on the display screen. Specifically, for example, in the event that a window for another application program is displayed at a maximum on the display screen, or in the event that the display luminance of the display screen is set to zero, the display image generating unit 15 stops the processing for display of standby background moving image. Note that, in the case of the present embodiment, the display image generating unit 15 determines using a preview visual signal PVS whether or not the repeated moving image can be displayed on the display screen. The preview visual signal PVS is a signal indicating whether or not the repeated moving image can be displayed on the display screen when a window for another application program is displayed at a maximum on the display screen, or when the display luminance of the display screen is set to zero. In the case of the present embodiment, the control unit 17 generates this preview visual signal PVS as an example.

Figure 6:
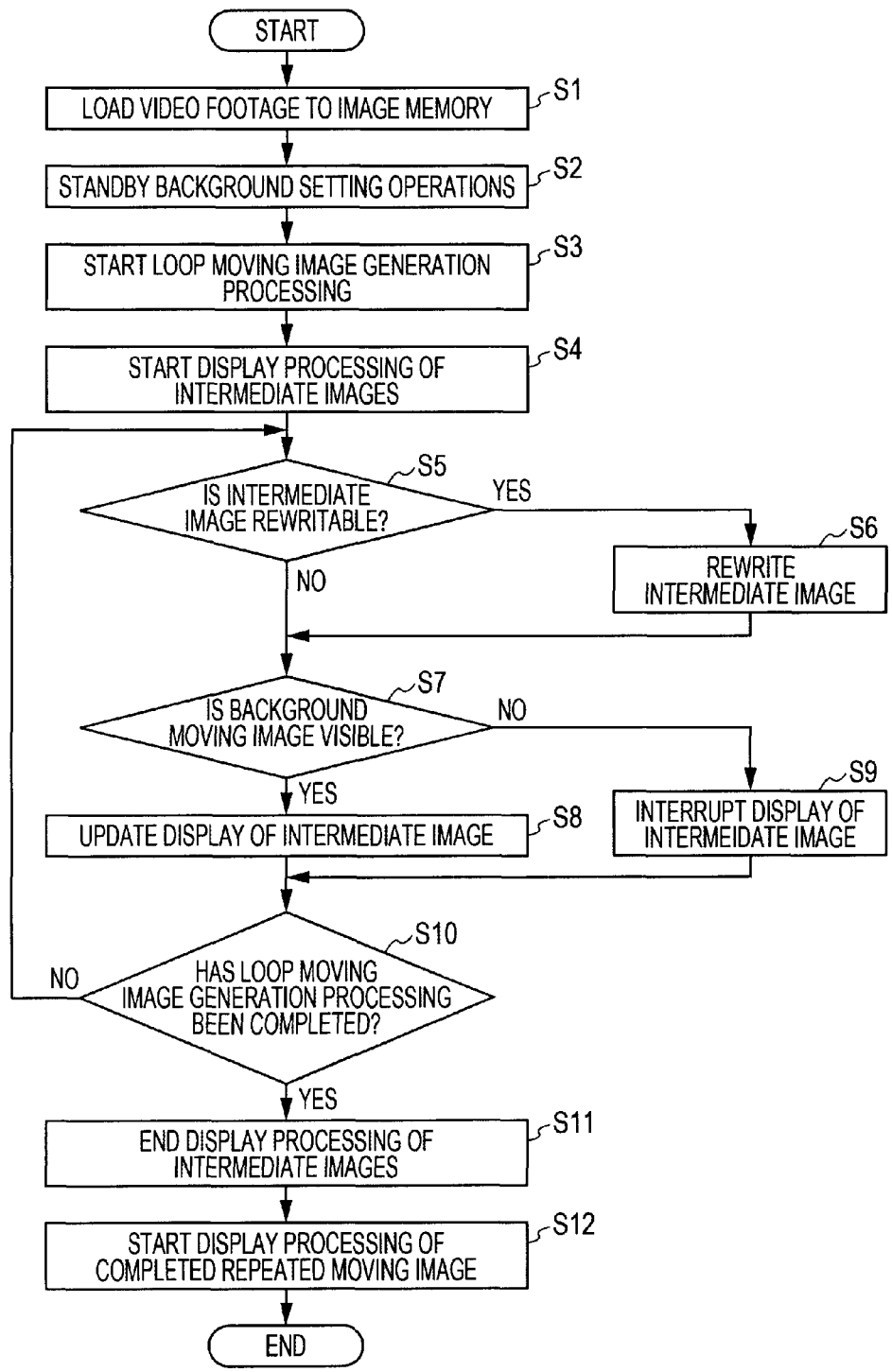
FIG. 6 is a flowchart illustrating the flow of the loop moving image generation processing for generating a repeated moving image made up of standby images at the personal digital assistant according to the present embodiment.

Flowchart of Personal Digital Assistant when Displaying Standby Background Moving Image FIG. 6 illustrates a flowchart of processing for generating and displaying a standby background moving image with the configuration example in FIG. 5. Note that, in the case of the present embodiment, the processing in the flowchart in FIG. 6 is realized by the CPU executing a standby screen program and the repeated moving image generating program according to the present embodiment, for example.

With the flowchart in FIG. 6, the control unit 17 formed within the CPU by execution of the program according to the present embodiment loads the video data VD to the first image memory unit 12 as processing in step S1, and further, in the event that the repeated moving image has been set to be used as a standby background image by a standby setting operation from the user or the like as processing in step S2, for example, the control unit 17 controls the image processing unit 13 to start the loop moving image generation processing as processing in step S3.

Upon starting the loop moving image generation processing, the control unit 17 controls the display image generating unit 15 to perform processing in step S4 through step S11 as processing in step S4.

Specifically, the control unit 17 controls the display image generating unit 15 to perform display of the repeated moving image using a frame image serving as the intermediate image as processing in step S4 through step S11 in parallel with the loop moving image generation processing by the image processing unit 13.

Upon display processing of the intermediate image being started, the display image generating unit 15 determines as processing in step S5 whether or not processing equivalent to one frame worth has been completed in the loop moving image generation processing, and the intermediate image is rewritable, and in the event of rewritable, rewrites the intermediate image by processing at the previous frame with the intermediate image newly obtained in the processing equivalent to one frame worth in the loop moving image generation processing as processing in step S6.

Also, the control unit 17 determines as processing in step S7 whether or not the state of this personal digital assistant is a state in which a standby background moving image cannot be displayed, as described above, since a window image other than the standby image is displayed on the entire screen of the display, or the display luminance of the display screen is set to zero for power saving. The display image generating unit 15 continues updating of the display of the intermediate image as processing in step S8 while receiving a preview visual signal PVS from the control unit 17 indicating that the standby background image can be displayed, and on the other hand, upon receiving a preview visual signal PVS indicating that the standby background moving image cannot be displayed from the control unit 17, interrupts the display processing of the intermediate image as processing in step S9.

Also, the control unit 17 determines as processing in step S10 whether or not the loop moving image generation processing at the image processing unit 13 has all been completed, and returns the processing to step S5 while the loop moving image generation processing has all not been completed.

On the other hand, in the event that the loop moving image generation processing at the image processing unit 13 has all been completed, the control unit 17 controls the display image generating unit 15 to end the repeated moving image display processing according to the intermediate image as processing in step S11. The control unit 17 then controls the display image generating unit 15 to display the repeated moving image after the loop moving image generation processing has all been completed on the display screen as processing in step S12.

As described above, with the personal digital assistant according to the present embodiment, after start of the loop moving generation processing, until the loop moving image generation processing thereof has been completed, a standby background moving image made up of the repeated moving image of the intermediate image is displayed on the display screen, and after the loop moving image generation processing thereof has all been completed, a standby background moving image made up of the repeated moving image after completion of this loop moving image generation processing is displayed.

Figure 7:
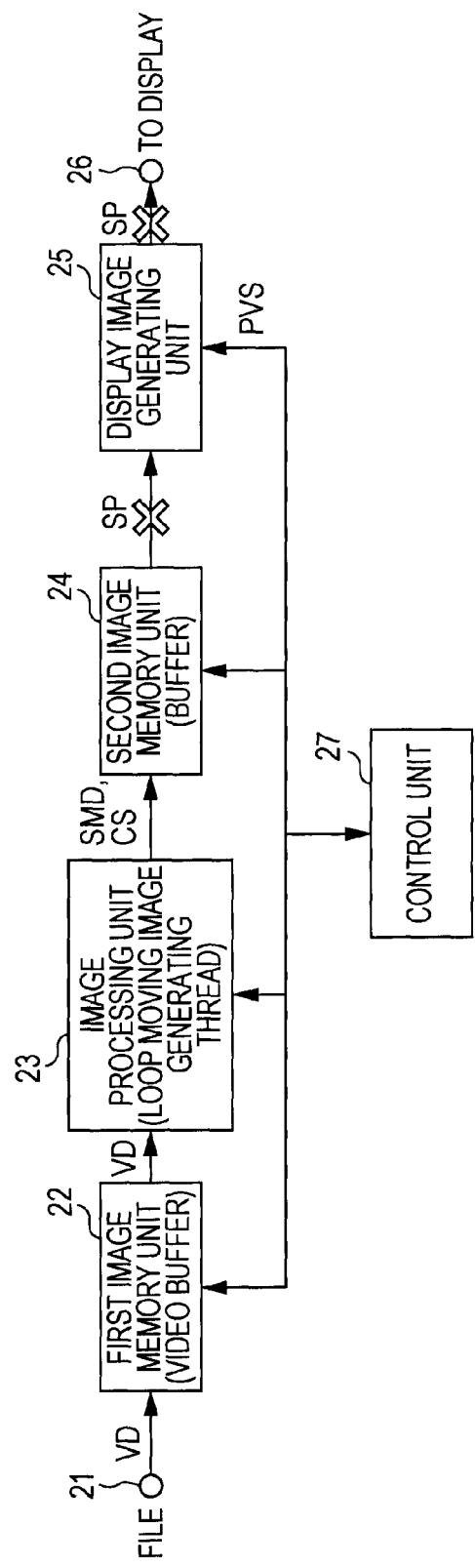
FIG. 7 is a functional block diagram illustrating the schematic configuration of principal portions according to the loop moving image generation processing for generating a repeated moving image made up of thumbnail images at the personal digital assistant according to the present embodiment.

Schematic Configuration of Personal Digital Assistant when Displaying Thumbnail Moving Image FIG. 7 illustrates the schematic configuration of principal portions in the event that a thumbnail moving image serving as the repeated moving image has been determined to be displayed on the display screen. Note that FIG. 7 illustrates an example wherein a thumbnail image generated from video data prepared as a file or obtained as the original moving image is displayed as a repeated moving image. Also, with the configuration in FIG. 7, an image processing unit 23 and a display image generating unit 25 may be prepared as hardware, or may be configured as a calculation function unit within a CPU owing to execution of a repeated moving image generating program according to the present embodiment.

In FIG. 7, video data VD in file units imaged and stored beforehand by a camera unit or obtained from a network or external storage device is supplied to an input terminal 21. Note that the reception units of the video data VD at the input terminal 21 may be any units, for example, such as the file units, frame units, scan line units, or the like in the same way as described above. The video data VD supplied to the input terminal 21 is input to a first image memory unit 22.

The first image memory unit 22 is a video buffer, temporarily accumulates the video data VD, and then outputs to the image processing unit 23 downstream under the writing/readout control of a control unit 27.

The image processing unit 23 clips, under the control of the control unit 27, the user's desired region or a region that the terminal automatically determined from the frame images making up the supplied video data VD, or reduces the frame images into the user's desired scale or a scale that the terminal automatically set to generate the thumbnail images corresponding to the time sequence of the frame images making up the video data VD. Further, the image processing unit 23 executes, under the control of the control unit 27, the loop moving image generation processing regarding the thumbnail images. Upon the processing in the certain units in the loop moving image generation processing corresponding to the thumbnail images being completed, the image processing unit 23 outputs thumbnail image data SMD after the processing in the certain units, and a completion signal CS to a second image memory unit 24.

The second image memory unit 24 is buffer memory for thumbnail display images to be supplied to a display image generating unit 25, accumulates, under the control of the control unit 27, the thumbnail image data SMD output from the image processing unit 23 upstream, and also outputs thumbnail image data SP to the display image generating unit 25 downstream.

The display image generating unit 25 successively reads out, under the control of the control unit 27, the thumbnail image data SP necessary for display indication from the second image memory unit 24, and outputs the thumbnail image data SP from an output terminal 26 to the display downstream. With the present embodiment, after the loop moving image generation processing is started, until this loop moving image generation processing has all been completed, the thumbnail image data SP of the intermediate image is output from the display image generating unit 25 to the display. Upon the loop moving image generation processing being all completed, thumbnail repeated moving image after completion of this loop moving image generation processing is output from the display image generating unit 25 to the display.

Note that, with this example as well, in the same way as with the case of the standby image display, an image other than the thumbnail images may be displayed on the display screen according to execution of another application program, or the display luminance of the display screen may be set to zero for power saving, for example. Therefore, only in the event that the display luminance is not zero, and also a thumbnail image is displayed, the display image generating unit 25 displays the thumbnail images converted into the repeated moving image on the display screen. Therefore, for example, in the event that an window for another application program is displayed at a maximum on the display screen, or in the event that the display luminance of the display screen is set to zero, the display image generating unit 25 stops the processing for display of the thumbnail moving image. Note that, in the case of the present embodiment, the display image generating unit 25 determines whether or not the thumbnail images can be displayed on the display screen using the preview visual signal PVS. In the case of this example, the preview visual signal PVS is a signal indicating whether or not the thumbnail image can be displayed on the display screen when a window for another application program is displayed at a maximum on the display screen, or when the display luminance of the display screen is set to zero. In the case of the present embodiment, the control unit 27 generates this preview visual signal PVS as an example.

Flowchart of Personal Digital Assistant when Displaying Thumbnail Image

Figure 8:
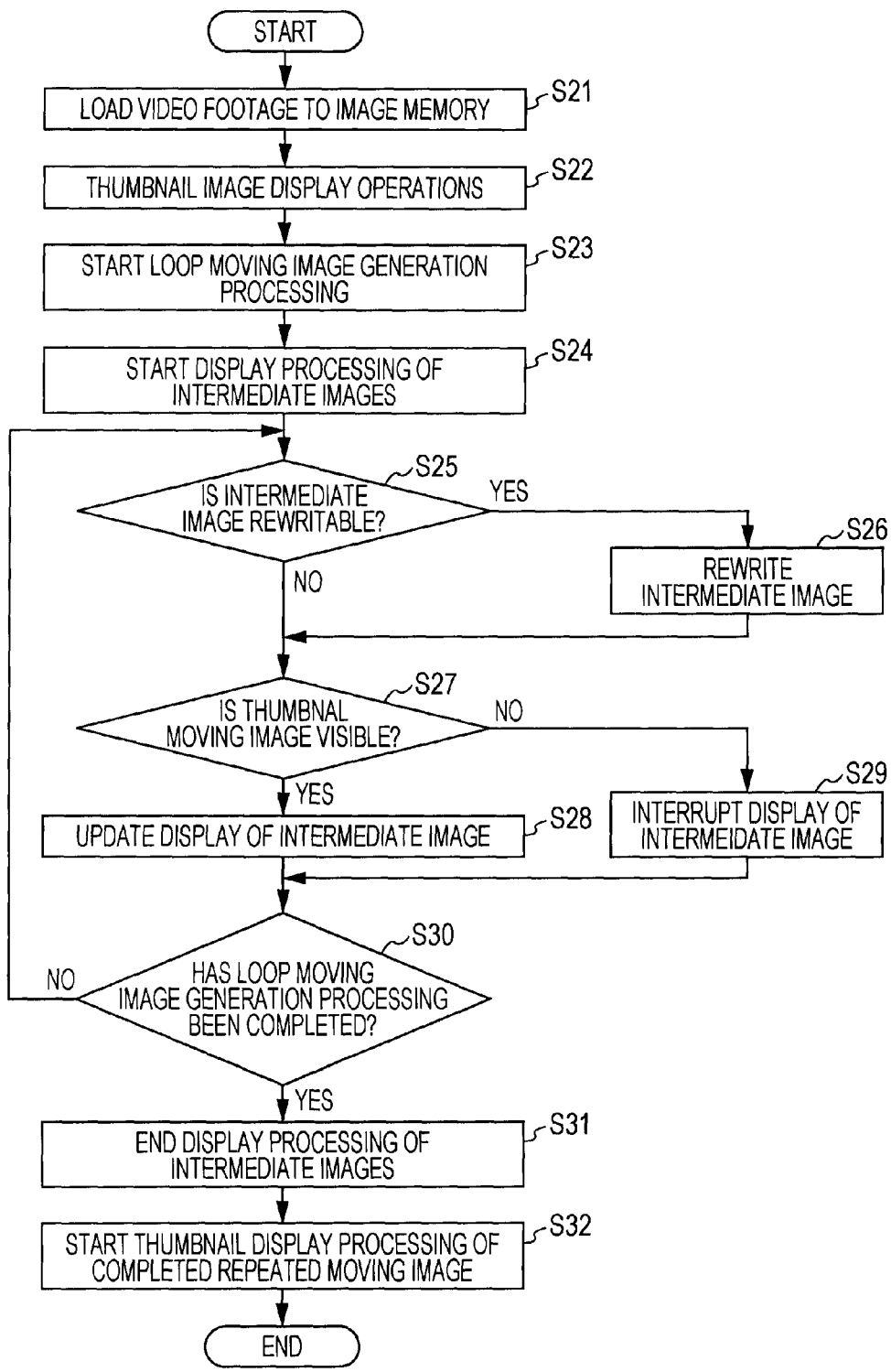
FIG. 8 is a flowchart illustrating the flow of the loop moving image generation processing for generating a repeated moving image made up of thumbnail images at the personal digital assistant according to the present embodiment.

FIG. 8 illustrates a flowchart of processing for generating and displaying a thumbnail image with the configuration example in FIG. 7. Note that, in the case of the present embodiment, the processing in the flowchart in FIG. 8 is realized by the CPU executing the repeated moving image generating program according to the present embodiment.

With the flowchart in FIG. 8, the control unit 27 formed within the CPU by execution of the program according to the present embodiment loads the video data VD in file units to the first image memory 22 as processing in step S21, and further, in the event that the repeated moving image made up of thumbnail images has been set to be used as a standby background image through a thumbnail image display setting operation from the user or the like as processing in step S22, the control unit 27 controls the image processing unit 23 to start generation of the thumbnail images, and loop moving image generation processing using the thumbnail images as processing in step S23.

Upon starting the loop moving image generation processing using the thumbnail images, the control unit 27 controls the display image generating unit 25 to perform processing in step S24 through step S31 as processing in step S24.

Specifically, the control unit 27 controls the display image generating unit 25 to perform display of the repeated moving image using an intermediate image obtained from a thumbnail image as processing in step S24 through step S31 in parallel with generation of a thumbnail image and loop moving image generation processing by the image processing unit 23.

Upon intermediate image display processing of a thumbnail image being started, the display image generating unit 25 determines as processing in step S25 whether or not processing equivalent to one frame worth has been completed in the loop moving image generation processing, and the intermediate image is rewritable, and in the event of rewritable, rewrites the intermediate image by processing at the previous frame with the intermediate image newly obtained in the processing equivalent to one frame worth in the loop moving image generation processing as processing in step S26.

Also, the control unit 27 determines as processing in step S27 whether or not the state of this personal digital assistant is a state in which a thumbnail image is not displayed, as described above, since an window image other than the standby image is displayed on the entire screen of the display, or the display luminance of the display screen is set to zero for power saving. The display image generating unit 25 continues updating of the display of the intermediate image as processing in step S28 while receiving a preview visual signal PVS from the control unit 27 indicating that a thumbnail image can be displayed, and on the other hand, upon receiving a preview visual signal PVS indicating that a thumbnail image cannot be displayed from the control unit 27, interrupts the display processing of the intermediate image as processing in step S29.

Also, the control unit 27 determines as processing in step S30 whether or not the loop moving image generation processing at the image processing unit 23 has all been completed, and returns the processing to step S25 while the loop moving image generation processing has all not been completed.

On the other hand, in the event that the loop moving image generation processing at the image processing unit 23 has all been completed, the control unit 27 controls the display image generating unit 25 to end the repeated moving image display processing according to the intermediate image of the thumbnail image as processing in step S31. The control unit 27 then controls the display image generating unit 25 to display the repeated moving image of the thumbnail image after the loop moving image generation processing has all been completed on the display screen as processing in step S32.

As described above, with the personal digital assistant according to the present embodiment, after start of the loop moving generation processing, until the loop moving image generation processing thereof has been completed, the repeated moving image made up of the intermediate image of a thumbnail image is displayed on the display screen, and after the loop moving image generation processing thereof has all been completed, the repeated moving image made up of a thumbnail after completion of this loop moving image generation processing is displayed.

Schematic Configuration of Personal Digital Assistant when Displaying Repeated Moving Image while Adjusting Frame Rate An arrangement may be made wherein the personal digital assistant according to the present embodiment displays a repeated moving image while performing the loop moving image generation processing as to video data of which the frame rate was lowered by extracting a frame image from input video data for each certain interval, and then increases the frame rate one after another until the frame rate reaches the same frame rate of the original input video data to continue the loop moving image generation processing and display of the repeated moving image.

Figure 9:
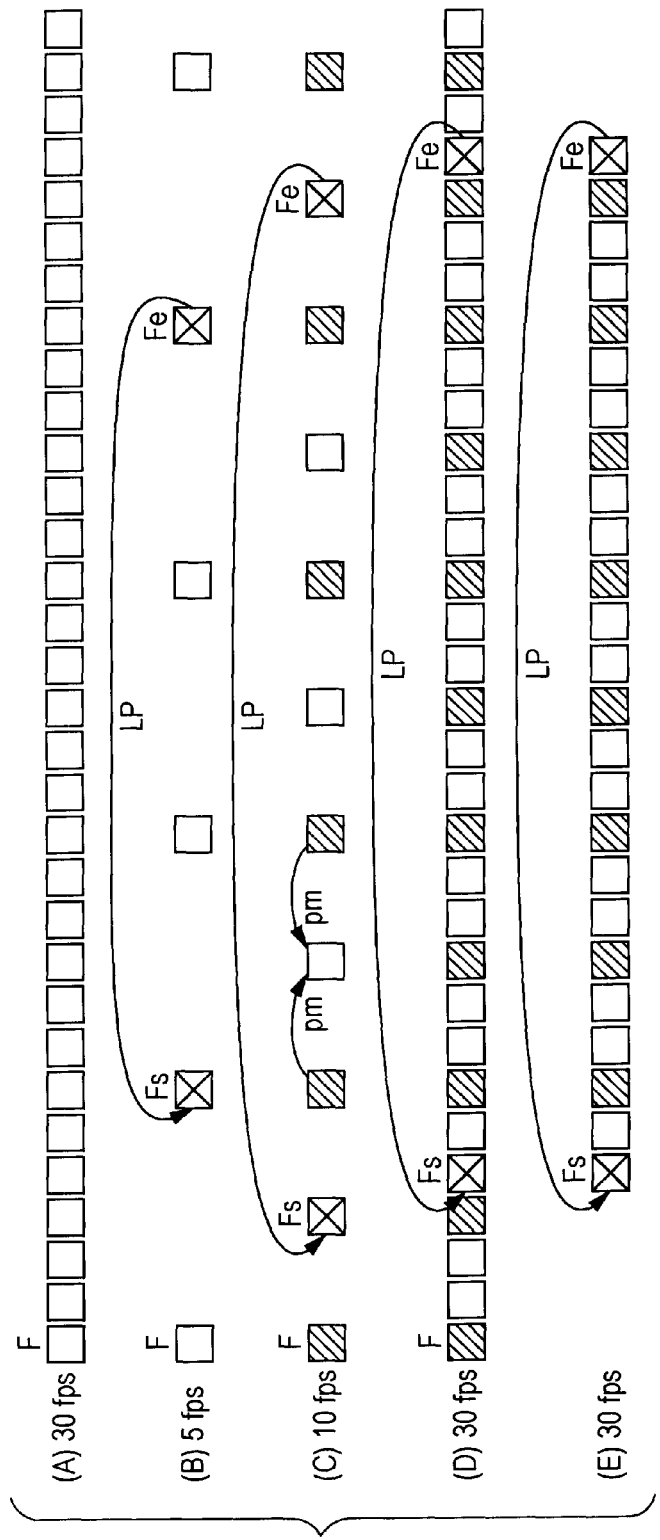
FIG. 9 is a diagram used for relationship description of the frames at the time of generating and displaying a repeated moving image while adjusting a frame rate with the present embodiment.
Figure 10:
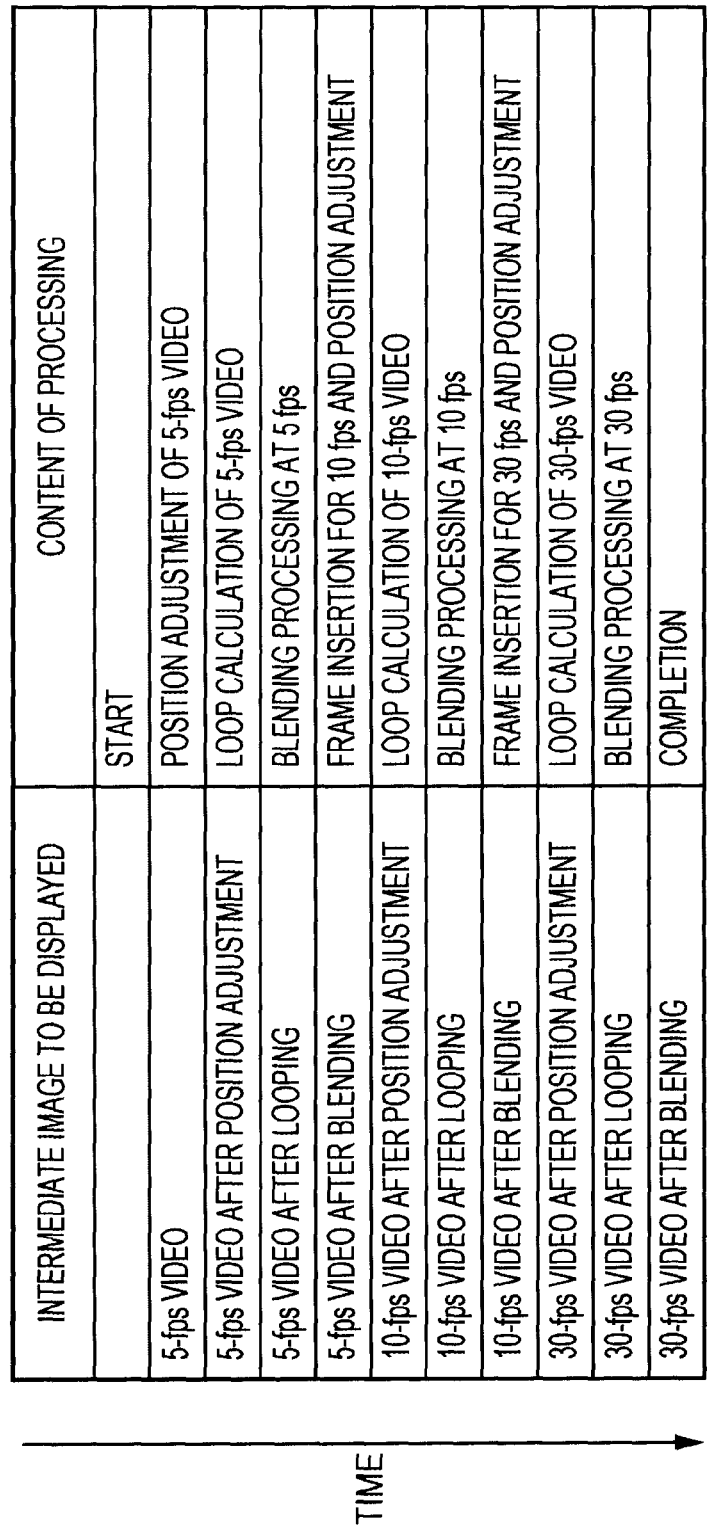
FIG. 10 is a diagram used for relationship description of the frame rates and loop moving image generation processing at the time of generating and displaying a repeated moving image while adjusting the frame rates with the present embodiment.

Specifically, for example, as shown in (A) in FIG. 9, in the event that the frame rate of the input video data is 30 fps (frame per second), the personal digital assistant according to the present embodiment extracts a frame image F for each 5 fps from the input video data at the loop processing start time point (thins out frame images other than these), thereby generating video data of which the frame rate is 5 fps as shown in (B) in FIG. 9 and FIG. 10. The personal digital assistant then executes, as described above, position adjustment processing pm, optimal repeated section detection processing from a frame image Fs through a frame image Fe, looping processing LP and blending processing between the frame image Fs and the frame image Fe thereof regarding the frame images F of the video data of which the frame rate is 5 fps. Thus, a repeated moving image, such as a so-called slide show wherein a frame image F is displayed for each 5 fps, is displayed on the display screen.

Next, the personal digital assistant according to the present embodiment extracts one frame image F each positioned between the frame images of the 5-fps repeated moving image from the input video data of which the frame rate is 30 fps, and adds each of the frame images F between the frame images of the 5-fps repeated moving image, thereby generating video data of which the frame rate is 10 fps such as shown in (C) in FIG. 9 and FIG. 10. The personal digital assistant then performs, regarding the added frame images of the frame images F of the video data of which the frame rate is 10 fps, the position adjustment processing pm with the 5-fps frame images on both sides thereof as a reference. Further, the personal digital assistant executes, regarding the 10-fps video data, the optimal repeated section detection processing between the frame image Fs through frame image Fe, and the loop processing LP and blending processing between the frame image Fs through frame image Fe. Thus, the repeated moving image such as a so-called slide show where the frame image F is displayed for each 10 fps is displayed on the display screen.

Next, the personal digital assistant according to the present embodiment extracts two frame images F each positioned between the frame images of the 10-fps repeated moving image from the input video data of which the frame rate is 30 fps, and adds each of the frame images F between the frame images of the 10-fps repeated moving image, thereby generating video data of which the frame rate is 30 fps such as shown in (D) in FIG. 9 and FIG. 10. The personal digital assistant then performs, regarding the added frame images of the frame images F of the video data of which the frame rate is 30 fps, the position adjustment processing pm with the 10-fps frame images back and forth thereof as a reference. Further, the personal digital assistant executes, regarding the 30-fps video data, the optimal repeated section detection processing between the frame image Fs through frame image Fe, and the loop processing LP and blending processing between the frame image Fs through frame image Fe. Thus, the repeated moving image where the frame image F is displayed for each 30 fps is displayed on the display screen.

Note that FIG. 9 and FIG. 10 illustrate an example wherein adjustment is performed from the frame rate of 10 fps to the frame rate of 30 fps, but an arrangement may be made wherein adjustment is performed from the frame rate of 10 fps to the frame rate of 20 fps, and then adjustment is performed from the frame rate of 20 fps to the frame rate of 30 fps.

Subsequently, upon the loop moving image generation processing as to the video data of which the frame rate is 30 fps being all completed, the personal digital assistant according to the present embodiment displays, as shown in (E) in FIG. 9 and FIG. 10, the repeated moving image of which the frame rate is 30 fps after completion of the loop moving image generation processing.

In this way, with the personal digital assistant according to the present embodiment, an arrangement may be made wherein a repeated moving image such as a slide show is displayed at the time of starting the loop moving image generation processing, and then a repeated moving image of which the frame rate is gradually increased is generated and displayed.

Figure 11:
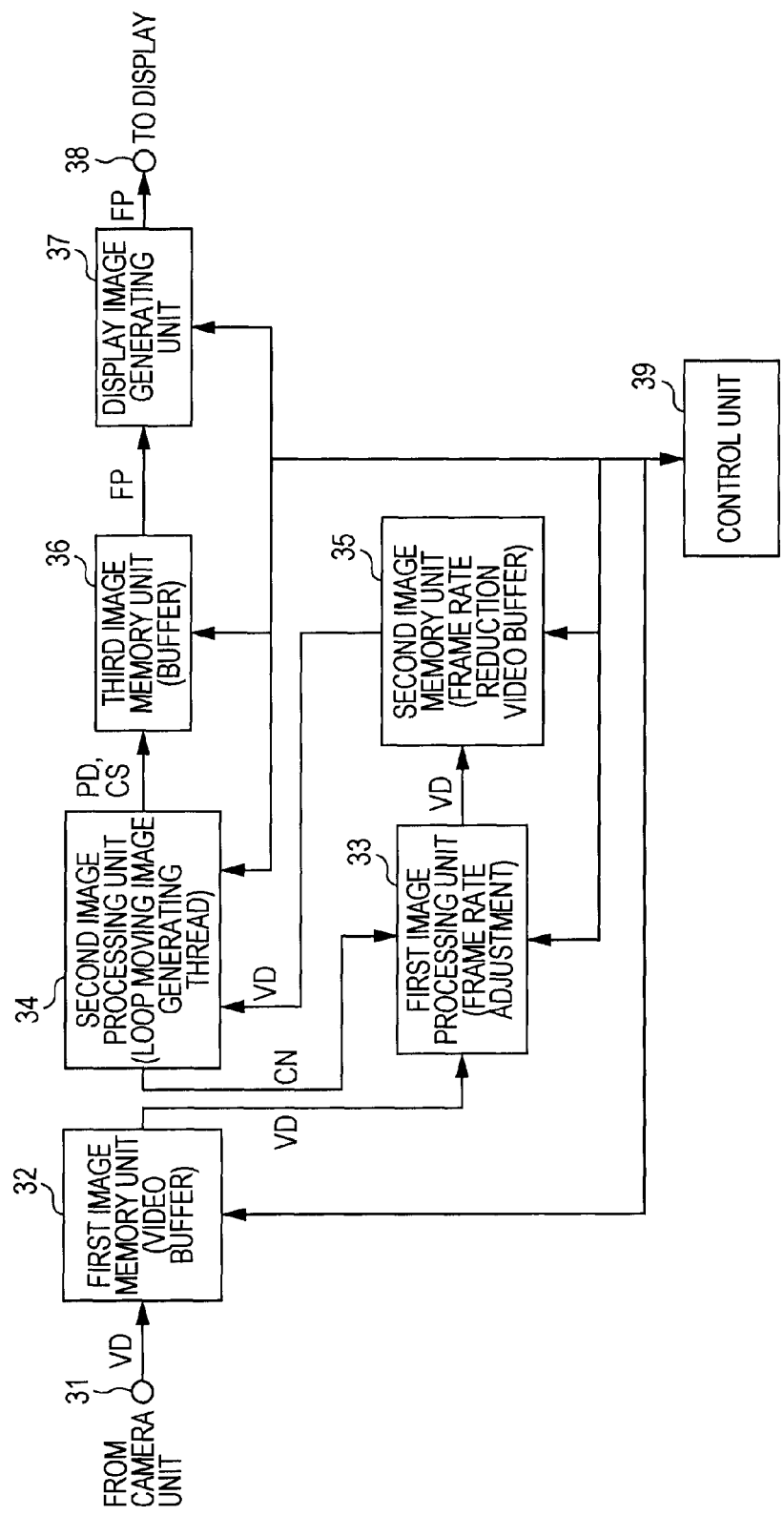
FIG. 11 is a function block diagram illustrating the schematic configuration of principal portions according to the loop moving image generation processing for generating a repeated moving image while adjusting the frame rates with the personal digital assistants according to the present embodiment.

FIG. 11 illustrates the schematic configuration of principal portions in the event of displaying a repeated moving image of which the frame rate has been gradually increased as described above with the personal digital assistant according to the present embodiment. Note that FIG. 11 illustrates an example wherein input video data imaged at the camera unit is used as the original moving image, and a repeated moving image of which the frame rate is gradually increased is generated and displayed from the input video data thereof. Also, with the configuration in FIG. 11, a first image processing unit 33, a second image processing unit 34, and a display image generating unit 37 may be prepared as hardware, or may be configured as a calculation function unit within the CPU by the repeated moving image generating program according to the present embodiment being executed.

In FIG. 11, video data VD imaged by the camera unit is supplied to an input terminal 31. Note that the reception units of the video data VD at the input terminal 31 may be, in the same way as describe above, any units, for example such as the file units, frame units, or scan line units. The video data VD supplied to the input terminal 31 is input to a first image memory unit 32.

The first image memory unit 32 is a video buffer, temporarily accumulates the video data VD, and then outputs to the image processing unit 33 downstream under the writing/readout control of a control unit 39.

The first image processing unit 33 has a configuration for adjusting the frame rate of video data under the control of the control unit 28. This first image processing unit 33 extracts a frame image from the input video data VD for each certain interval (thins out frame images other than these), thereby generating video data VD of the frame rate is lowered to a first frame rate such as the above-mentioned 5 fps, and outputs to a second image memory unit 35 downstream. Note that the first image processing unit 33 blends an adjacent frame image as to the frame images of the video data VD adjusted to the first frame rate, and also subjects to so-called Buller processing, whereby visual connection between the frame images can be secured, i.e., processing such that pictures are prevented from being discontinuous.

The second image memory unit 35 is a video buffer for the video data VD after adjustment of the frame rate. This second memory unit 35 at the time of start of the loop moving image generation processing temporarily accumulates, under the writing/readout control of the control unit 39, the video data VD adjusted to the first frame rate, and then outputs to the second image processing unit 34 downstream.

The second image processing unit 34 uses, under the control of the control unit 39, the frame images making up the video data VD after adjustment of the frame rate to perform the loop moving image generation processing such as described above, and also outputs each frame image serving as the intermediate image during the loop moving image generation processing to a third image memory unit 36. The second image processing unit 34 at the time of start of the loop moving image generation processing executes the loop moving image generation processing as to the video data VD of the first frame rate. Also, upon the loop moving image generation processing using the video data VD after adjustment of the frame rate being completed, the second image processing unit 34 outputs a completion signal CS indicating that effect to the first image processing unit 33. Note that, in the case of this example, the completion signal CS is a signal for requesting the data of a new frame image for increasing the frame rate.

The first image processing unit 33 which has received the completion signal CS extracts, under the control of the control unit 39, a frame image used at the time of generating video data of a second frame rate such as the above-mentioned 10 fps from the input video data VD accumulated in the first image memory unit 32, and outputs to the second image memory unit 35. This second image memory unit 35 at this time temporarily accumulates, under the writing/readout control of the control unit 39, the data of a frame image to be used for generation of video data of the second frame rate, and then outputs to the second image processing unit 34 downstream.

The second image processing unit 34 at this time adds the frame image supplied from the second image memory unit 35 to the video data of the first frame rate subjected to the loop moving image generation processing, thereby generating video data of the second frame rate. The second image processing unit 34 then performs the loop moving image generation processing as to the video data of the second frame, and also outputs each frame image serving as the intermediate image during the loop moving image generation processing thereof to the third image memory unit 36. Also, upon the loop moving image generation processing using the video data VD of the second frame rate being completed, the second image processing unit 34 outputs a completion signal CS indicating that effect to the first image processing unit 33.

Hereafter, the first image processing unit 34 and second image memory unit 35 perform frame rate adjustment processing such as gradually increasing the frame rate, and the second image processing unit 34 performs the same loop moving image generation processing as described above as to video data after frame rate adjustment.

The third image memory unit 36 is buffer memory for frame images to be supplied to the display image generating unit 37 downstream. Specifically, this third image memory unit 36 accumulates, under the writing/readout control of the control unit 39, image data PD output at each of the frame rates such as described above from the second image processing unit 34 upstream, and also outputs image data FP in frame units to the display image generating unit 37 downstream.

The display image generating unit 37 successively reads out, under the control of the control unit 39, the image data FP in frame units necessary for display indication from the third image memory unit 36, and outputs the frame image data FP thereof from an output terminal 38 to the display. That is to say, in the case of this example, the frame image data FP of the intermediate image while the loop moving image generation processing is performed is output to the display at each of the frame rates. Subsequently, upon the frame rate becoming the frame rate of the input video data, and the whole of the loop moving image generation processing at the frame rate thereof being completed, a repeated moving image after the loop moving image generation processing is output from the display image generating unit 37 to the display.

Figure 12:
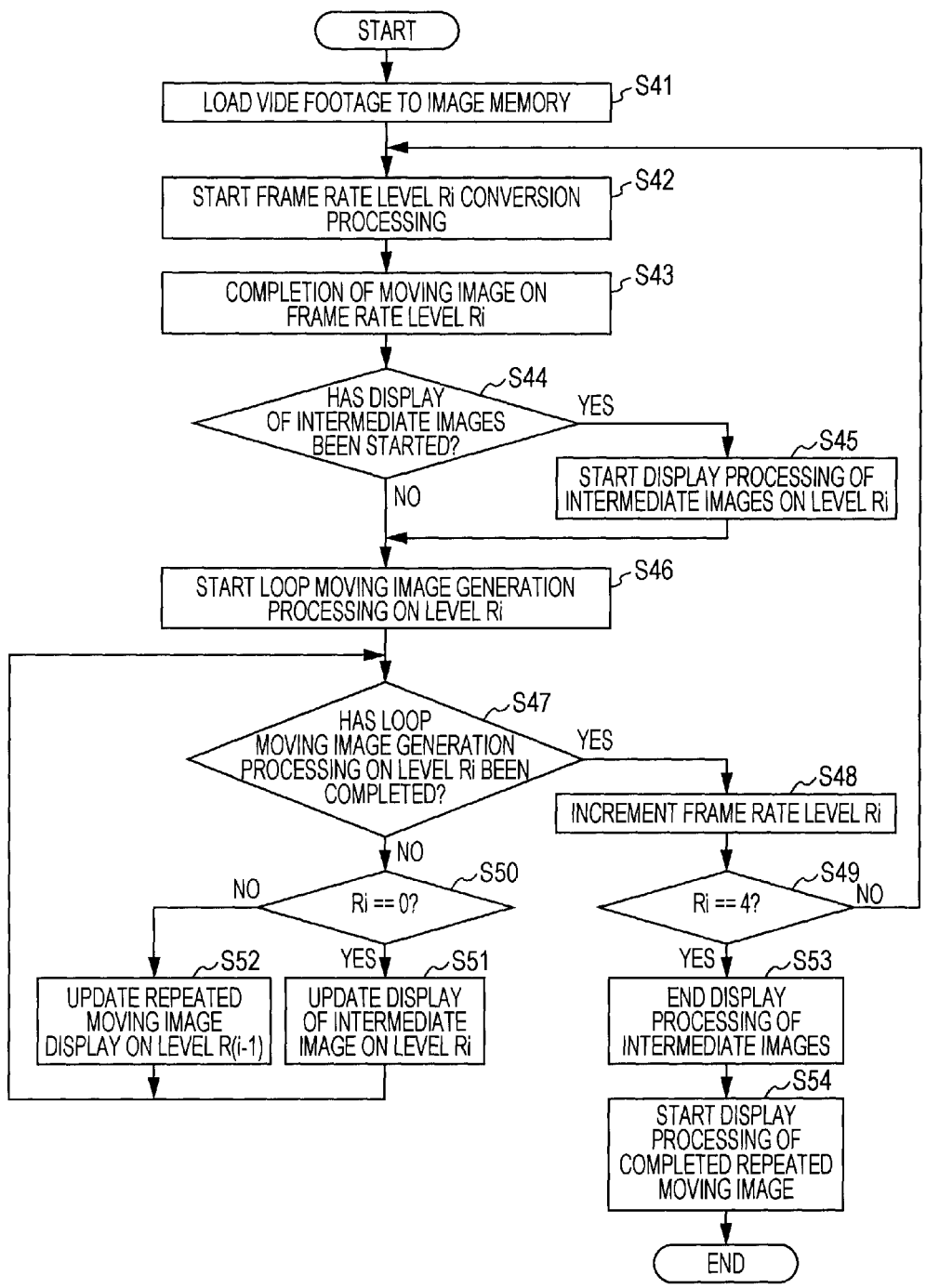
FIG. 12 is a flowchart illustrating the flow of the loop moving image generation processing for generating a repeated moving image while adjusting the frame rates with the personal digital assistants according to the present embodiment.

Flowchart of Personal Digital Assistant when Displaying Repeated Moving Image while Adjusting Frame Rate FIG. 12 illustrates a flowchart of processing for generating and displaying a repeated moving image while adjusting the frame rate with a configuration example in FIG. 11. Note that, in the case of the present embodiment, the processing of the flowchart in FIG. 12 is realized by the repeated moving image generating program according to the present embodiment being executed by the CPU.

With the flowchart in FIG. 12, the control unit 39 formed in the CPU by execution of the program according to the present embodiment loads the video data VD to the first image memory unit 32 as processing in step S41, and then sets a variable for determining the frame rate (hereafter, referred to as frame rate level Ri) as processing in step S42. With this example, a value of "0" through "4" is set as the value of the frame rate level Ri. As an example, the frame rate level Ri=0 corresponds to the frame rate of 5 fps, frame rate Ri=1 corresponds to 10 fps, frame rate level Ri=2 corresponds to 20 fps, frame rate level Ri=3 corresponds to 30 fps, and frame rate level Ri=4 corresponds to end of frame rate adjustment, respectively.

Upon the frame rate level Ri being set in the above-mentioned step S42, the control unit 39 controls each of the first image memory unit 32, first image processing unit 33, and second image memory unit 35 as processing in step S43 to generate video data of the frame rate corresponding to the frame rate level Ri, and further controls these and the second image processing unit 34 to perform processing in step S44 through step S52.

That is to say, upon the video data of the frame rate level Ri being generated in step S43, the control unit 39 determines whether or not display of the intermediate image by the loop moving image generation processing as to the video data of the frame rate level Ri has been started as processing in step S44. In the event that determination is made that display of the intermediate image has been started, the control unit 39 advances the processing to step S45 to control the second image processing unit 34, third image memory unit 36, and display image generating unit 37 to display the repeated moving image of the intermediate image of this frame rate level Ri. On the other hand, in the event that display of the intermediate image at the frame rate level Ri has not been started, the control unit 39 advances the processing to step S46.

Upon proceeding to the processing in step S46, the control unit 39 controls the second image processing unit 34 to start the loop moving image generation processing as to the video data of the frame rate level Ri. The control unit 39 then determines whether or not the loop moving image generation processing as to the video data of the frame rate level Ri has been completed as processing in step S47, and in the event that the loop moving image generation processing has not been completed, advances the processing to step S50.

Upon proceeding to the processing in step S50, the control unit 39 determined whether or not the value of the frame rate level Ri is "0". In the event that the value of the frame rate level Ri is "0", the control unit 39 controls the second image processing unit 34, third image memory unit 36, and display image generating unit 37 to continue updating of display using the repeated moving image of the intermediate image at the frame rate level Ri as processing in step S51. On the other hand, in the event that the value of the frame rate level Ri is not "0", the control unit 39 controls the second image processing unit 34, third image memory unit 36, and display image generating unit 37 to continue updating of display using the repeated moving image of the intermediate image at the frame rate level R(i−1) as processing in step S52.

Also, upon determining that the loop moving image generation processing as to the video data of the frame rate level Ri has been completed in step S47, the control unit 39 advances the processing to step S48.

Upon proceeding to the processing in step S48, the control unit 39 increments the value of the frame rate level Ri, and advances the processing to step S49.

Next, the control unit 39 determines whether or not the value of the frame rate level Ri has become "4" as processing in step S49, and in the event that the value has not become "4", returns the processing to step S42, and in the event that the value has become "4", advances the processing to step S53.

Upon proceeding to the processing in step S53, the control unit 39 controls the first image memory unit 32, first image processing unit 33, second image memory unit 35, second image processing unit 34, third image memory unit 36, and display image generating unit 37 to end the display processing of the intermediate image by the loop moving image generation processing.

The control unit 39 then controls the third image memory unit 36 and display image generating unit 37 to start display processing of the repeated moving image after completion of the loop moving image generation processing as processing in step S54.

Figure 13:
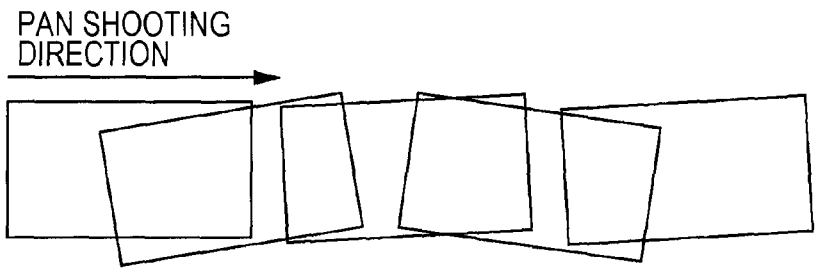
FIG. 13 is a diagram illustrating an example of the frames of video data at the time of generating a panoramic repeated moving image with the personal digital assistants according to the present embodiment.
Figure 14:
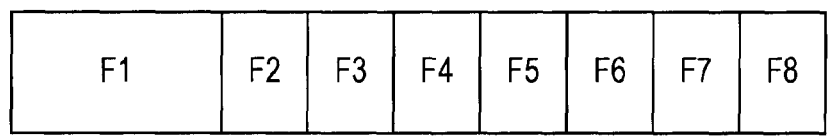
FIG. 14 is a diagram illustrating an example of the frames of video data subjected to position adjustment processing at the time of generating a panoramic repeated moving image with the personal digital assistants according to the present embodiment.
Figure 15:
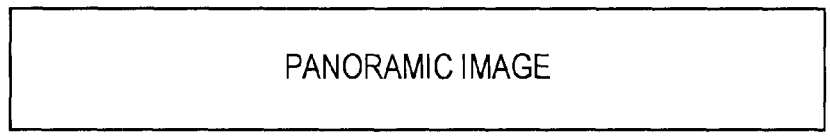
FIG. 15 is a diagram illustrating an example of a panoramic image generated at the time of generating a panoramic repeated moving image with the personal digital assistants according to the present embodiment.

Schematic Configuration of Personal Digital Assistant when Generating and Displaying Repeated Moving Image from Panoramic Image by Pan Shooting The personal digital assistant according to the present embodiment obtains multiple video frame images by so-called pan shooting for performing video shooting while moving the camera unit in a certain direction (e.g., horizontal direction) as shown in FIG. 13 for example, and connects the multiple video frame images (e.g., video frame images F1 through F8) by subjecting to shaking correction or tilt correction or the like as shown in FIG. 14, whereby a so-called panoramic image such as shown in FIG. 15 can be generated.

Figure 16:
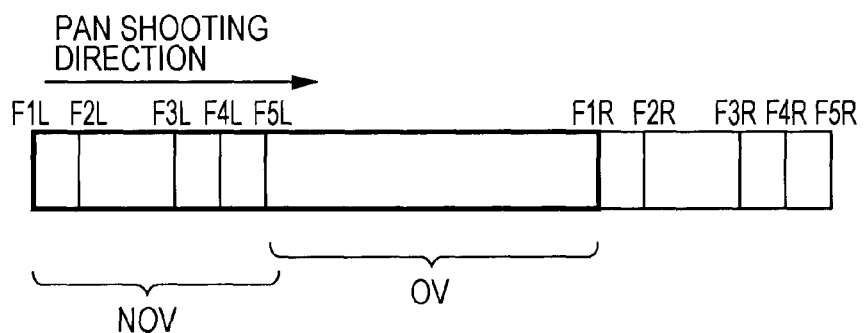
FIG. 16 is a diagram used for description of an overlapped image portion at the time of generating a panoramic repeated moving image with the personal digital assistants according to the present embodiment.

With the pan shooting, in the event of slowly taking an image while moving the camera unit in a certain direction (horizontal direction or the like) with some degree of time being spent, as shown in FIG. 16, there is an overlapped image portion OV within each video frame image by videography thereof. Specifically, with the example in FIG. 16, for example, if we say that a shooting range in the horizontal direction in a video frame image F1 is a range of F1L through F1R, a shooting range in the horizontal direction in a video frame image F2 is F2L through F2R, a shooting range in the horizontal direction in a video frame image F3 is F3L through F3R, a shooting range in the horizontal direction in a video frame image F4 is F4L through F4R, and a shooting range in the horizontal direction in a video frame image F5 is F5L through F5R, the image portion OV is an image with an overlapped shooting range of these five video frame images, and an image portion NOV is an image with a range where none of the five video frame images is overlapped.

Figure 17:
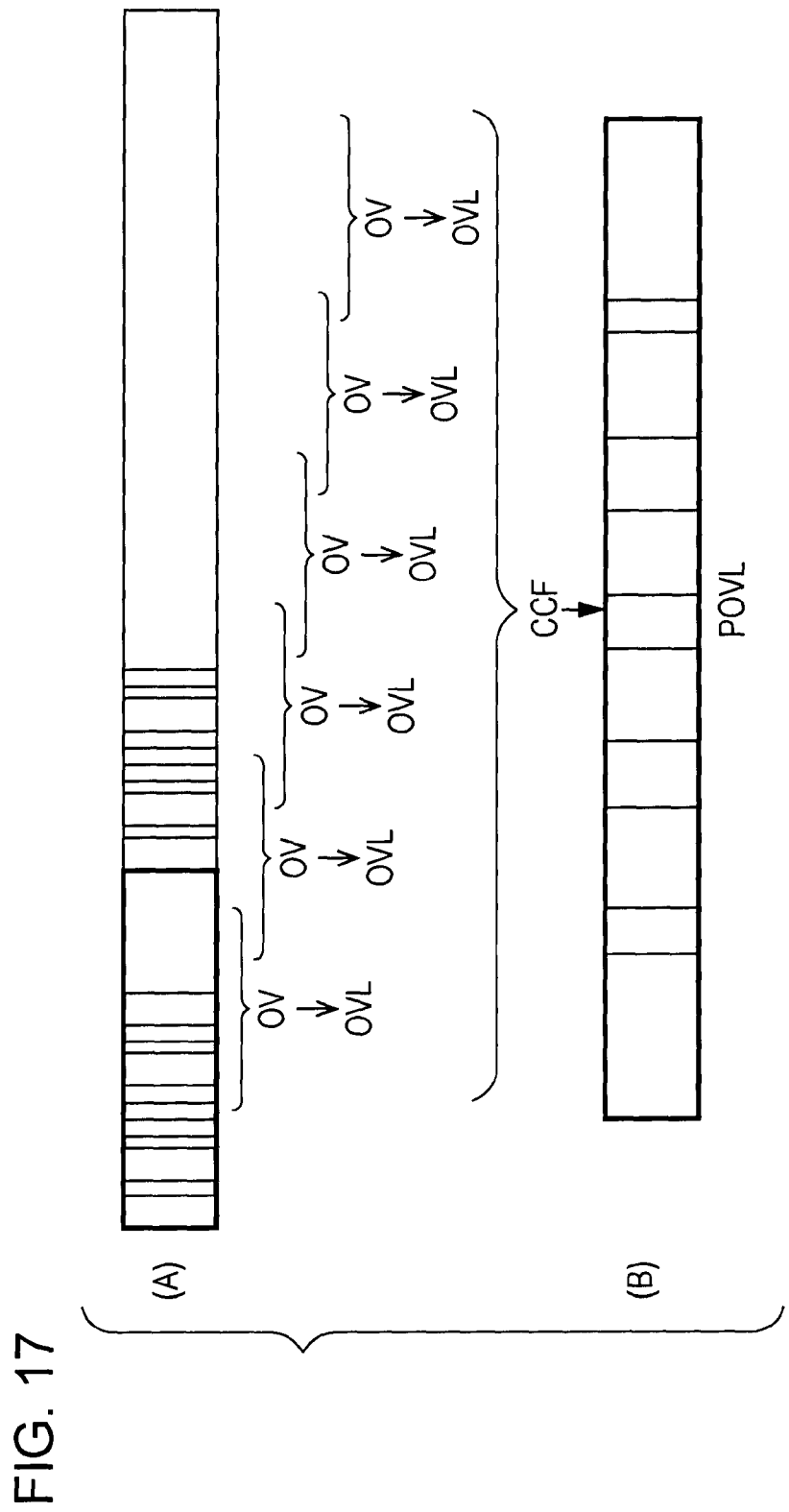
FIG. 17 is a diagram used for description of multiple overlapped image portions and a panoramic repeated moving image made up of these at the time of generating a panoramic repeated moving image with the personal digital assistants according to the present embodiment.

Therefore, for example, in the event that videography including an overlapped image portion has been performed by pan shooting as shown in (A) in FIG. 17, overlapped image portions OV are obtained.

The personal digital assistant according to the present embodiment performs the loop moving image generation processing as described above regarding each of the overlapped image portions OV to generate a repeated moving image OVL of each of the overlapped image portions OV in the following manner, and further performs processing CCF to connect the overlapped portions of the repeated moving images OVL while blending these, whereby a panoramic repeated moving image POVL such as shown in (B) in FIG. 17 can be generated.

Here, with the present embodiment, let us say that the number of frames making up the overlapped image is a predetermined number whereby the overlapped image can visually be taken as a moving image (30 frames as an example), and the time periods (moving image length) of the repeated moving images OVL of the overlapped image portions OV are the same. Also, the moving images of the overlapped image portions OV are temporally shifted, but with the personal digital assistant according to the present embodiment, scenes that can be connected on an image even with a time lag are taken as an object to be processed. Further, at the time of generating the repeated moving images OVL of the overlapped image portions OV, the personal digital assistant according to the present embodiment processes these so as to have an overlap regarding only a certain portion between the repeated moving images. The personal digital assistant according to the present embodiment then performs processing CCF for connecting each frame of the repeated moving images OVL of the overlapped image portions OV by subjecting to alpha blending one frame at a time to generate a panoramic repeated moving image POVL made up of the repeated moving images OVL of the overlapped image portions OV. Also, the connection portions of the repeated moving images OVL of the overlapped image portions OV are mixed by cross-fade processing, for example.

Figure 18:
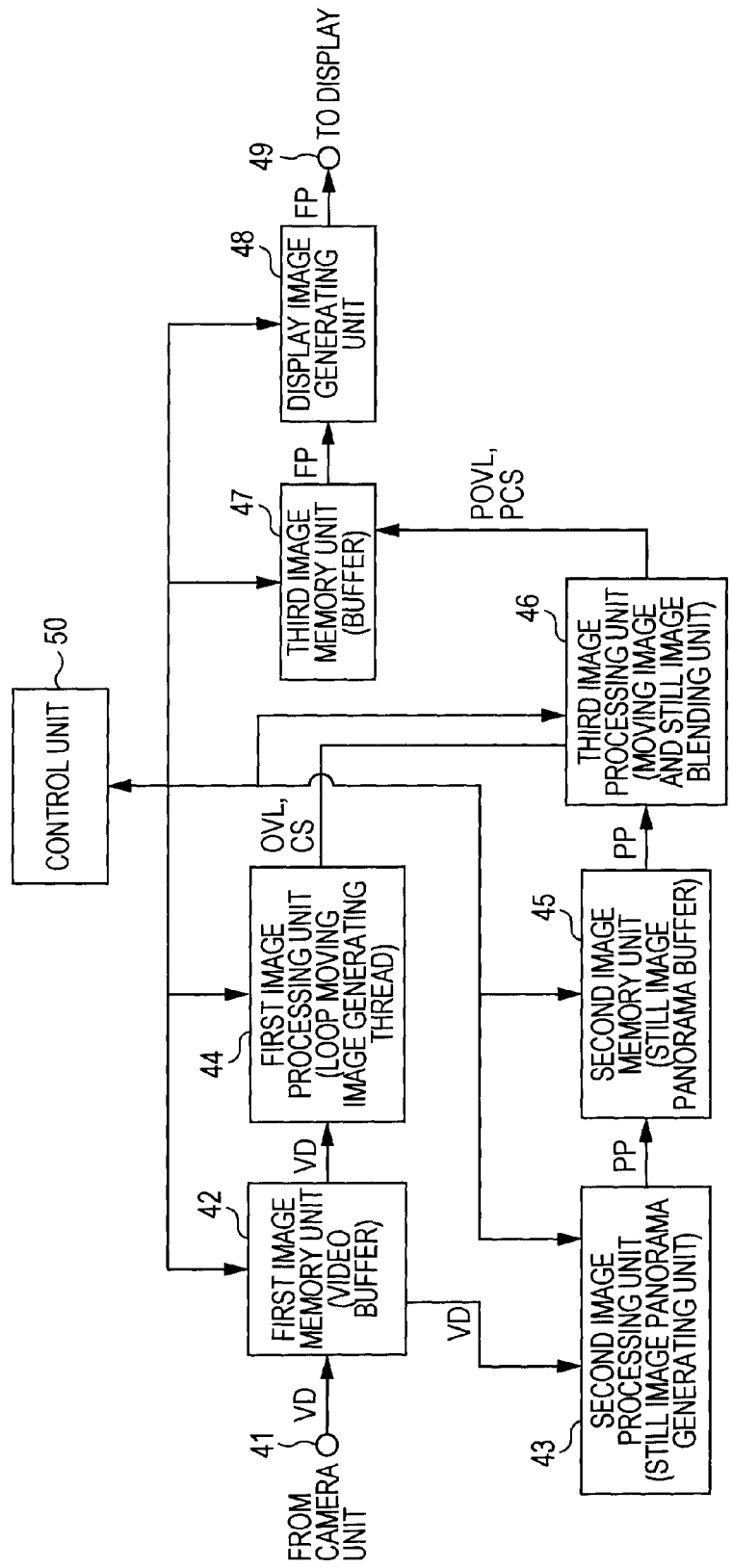
FIG. 18 is a functional block diagram illustrating the schematic configuration of principal portions according to the loop moving image generation processing for generating a panoramic repeated moving image with the personal digital assistants according to the present embodiment.

FIG. 18 illustrates the schematic configuration of principal portions in the event that the personal digital assistant according to the present embodiment performs, for example, the loop moving image generation processing regarding multiple overlapped image portions OV such as described above from video data including overlapped image portions by pan shooting for example to generate and display a repeated moving image OVL according to each of the overlapped image portions OV. Note that FIG. 18 illustrates an example wherein input video data subjected to pan shooting at the camera unit as the original moving image is used to generate and display the repeated moving images OVL of the aforementioned overlapped image portions OV from the input video data thereof. Also, with the configuration in FIG. 18, a first image processing unit 44, a second image processing unit 43, a third image processing unit 46, and a display image generating unit 48 may be prepared as hardware, or may be configured as a calculation function unit within the CPU by the repeated moving image generating program according to the present embodiment being executed for example.

In FIG. 18, video data VD subject to pan shooting at the camera unit is supplied to an input terminal 41. Note that the reception units of the video data VD at the input terminal 41 may be any units, for example, such as the file units, frame units, scan line units, or the like in the same way as described above. The video data VD supplied to the input terminal 41 is input to a first image memory unit 42.

The first image memory unit 42 is a video buffer, temporarily accumulates the video data VD, and then outputs to the first image processing unit 44 and second image processing unit 43 downstream under the writing/readout control of a control unit 50.

The second image processing unit 43 performs tilt correction or the like on the images making up the video data VD subjected to pan shooting to connect these, thereby generating a panoramic image PP under control of the control unit 50. The panoramic image PP generated by the second image processing unit 43 is transmitted to the second image memory unit 45.

The second image memory unit 45 temporarily accumulates the data of the panoramic image PP, and then outputs to the third image processing unit 46 downstream under the writing/readout control of the control unit 50.

Also, the first image processing unit 44 which has received the video data VD from the first image memory unit 42 performs the loop image generation processing regarding the overlapped image portions OV to generate the repeated moving images OVL of the overlapped image portions OV under the control of the control unit 50. Upon generating the repeated moving images OVL of the overlapped image portions OV, the first image processing unit 44 outputs the data of the repeated moving images OVL, and a completion signal CS indicating completion of each of the loop moving image generation process to the third image processing unit 46.

The third image processing unit 46 blends the panoramic image PP supplied from the second image memory unit 45, and the repeated moving images OVL of the overlapped image portions OV. Upon this blending processing being completed, the third image processing unit 46 outputs the panoramic repeated moving image POVL obtained by blending the repeated moving images OVL to the panoramic image PP, and subjecting to combining processing CCF, and a completion signal PCS indicating completion of the processing thereof to the third image memory unit 47.

The third image memory unit 47 is buffer memory for frame images to be supplied to the display image generating unit 48 downstream. Specifically, this third image memory unit 47 accumulates, under the writing/readout control of the control unit 50, the image data of the panoramic repeated moving image POVL such as described above from the third image processing unit 46 upstream, and also outputs the image data FP in frame units to the display image generating unit 48 downstream.

The display image generating unit 48 successively reads out, under the control of the control unit 50, the image data FP in frame units necessary for display indication from the third image memory unit 47, and outputs the frame image data FP thereof from an output terminal 49 to the display downstream. That is to say, in the case of this example, of the panoramic repeated moving image POVL, moving image data in a range that can be displayed on the display screen is output from the display image generating unit 48. Thus, of the panoramic repeated moving image POVL, the repeated moving image in a range that can be displayed on the display screen is displayed on the display screen, and accordingly, upon the user's desired range being selected from the panoramic repeated moving image POVL, the repeated moving image in the range thereof is displayed on the display screen.

Figure 19:
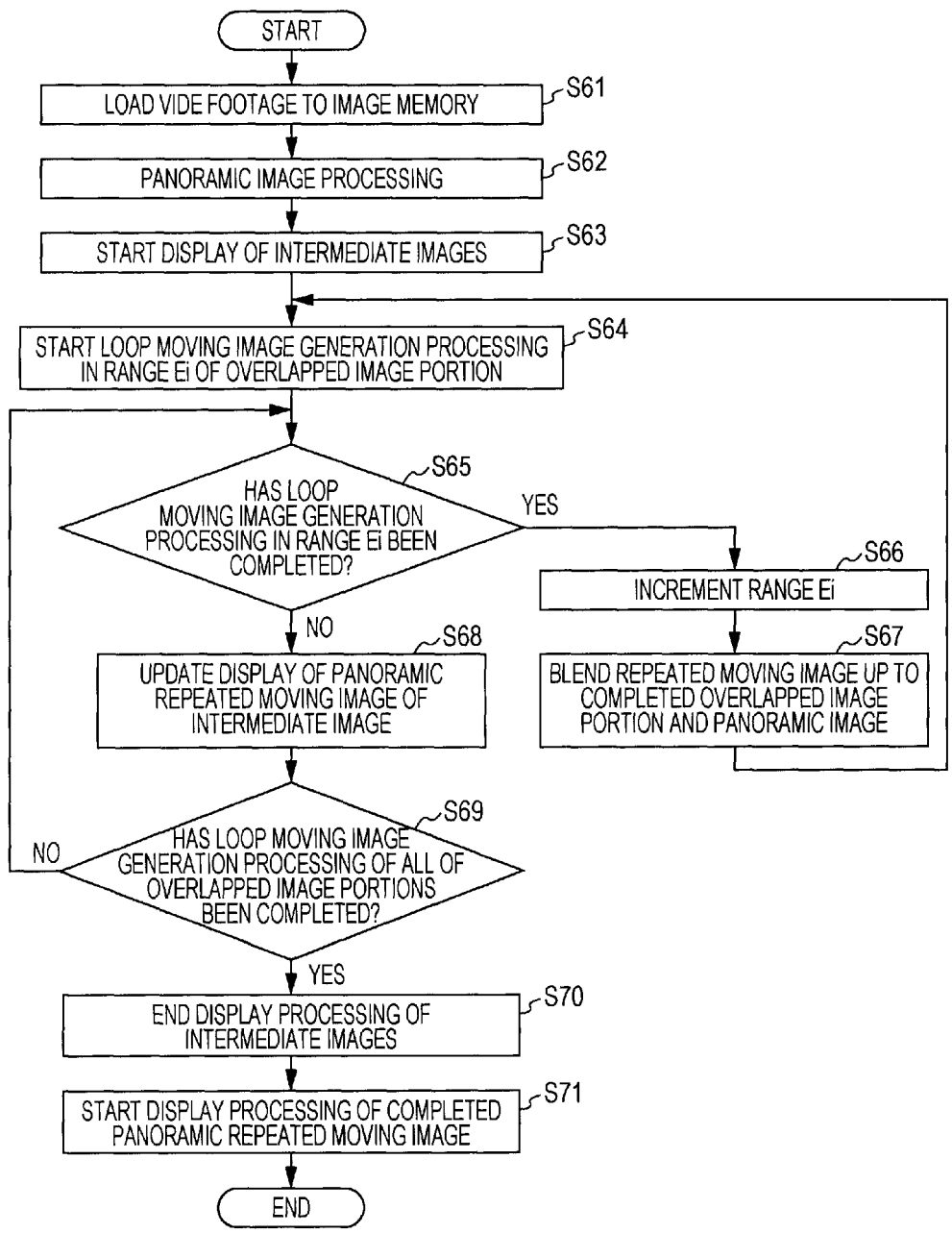
FIG. 19 is a flowchart illustrating the flow of the loop moving image generation processing for generating a panoramic repeated moving image with the personal digital assistants according to the present embodiment.

Flowchart of Personal Digital Assistant when Generating and Displaying Repeated Moving Image from Panoramic Image by Pan Shooting FIG. 19 illustrates a flowchart of processing for generating and displaying a repeated moving image from a panoramic image by pan shooting with the configuration example in FIG. 18. Note that in the case of the present embodiment, the processing of the flowchart in FIG. 19 is realized by the repeated moving image generating program and panoramic image generating program according to the present embodiment being executed by the CPU.

With the flowchart in FIG. 19, the control unit 50 formed in the CPU by execution of the program according to the present embodiment loads the video data VD to the first image memory 42 as processing in step S61, and then controls the second image processing unit 43 to generate a panoramic image PP as processing in step S62.

Also, the control unit 50 controls the display image generating unit 48 to start display of the intermediate image as processing in step S63, and controls the first image processing unit 44 to start the loop moving image generation processing regarding the overlapped image portions OV as processing in step S64.

Specifically, first in step S64, the control unit 50 sets a variable representing the position of each of the overlapped image portions OV (hereafter, referred to as overlapped range Ei), controls the first image processing unit 44 to start the loop moving image generation processing as described above regarding the overlapped image portion of this overlapped range Ei. Note that the value of the overlapped range Ei corresponds to each shooting range in the time sequence at the time of performing videography, for example, while moving the camera unit in the horizontal direction.

Next, the control unit 50 determines whether or not the loop moving image generation processing regarding the corresponding overlapped range Ei by the first image processing unit 44 has been completed as processing in step S65, and in the event that the loop moving image generation processing has been completed, advances the processing to step S66, and in the event that the loop moving image generation processing has not been completed, advances the processing to step S68.

Upon proceeding to the processing in step S68, the control unit 50 controls the third image memory unit 47 and display image generating unit 48 to continue updating of display of the repeated moving image of the intermediate image by the loop moving image generation processing of the overlapped image portion of this overlapped range Ei.

In step S69, the control unit 50 then determines whether or not the loop moving image generation processing regarding the overlapped image portions of the entire overlapped range Ei has been completed, and in the event that the loop moving image generation processing has been completed, advances the processing to step S70, and in the event that the loop moving image generation processing has not been completed, returns the processing to step S65.

Also, with the determination processing in step S65, upon determining that the loop moving image generation processing regarding the overlapped range Ei has been completed, and proceeding to the processing in step S66, the control unit 50 increments the overlapped range Ei, and advances the processing to step S67.

Upon proceeding to the processing in step S67, the control unit 50 controls the third image processing unit 46 to blend (mix) the repeated moving image up to the overlapped range Ei where the loop moving image generation processing has been completed, and the panoramic image, and returns the processing to step S64.

Also, upon determining that the loop moving image generation processing regarding the overlapped image portions of the entire overlapped range Ei has been completed in step S69, and proceeding to the processing in step S70, the control unit 50 controls the third image memory unit 47 and display image generating unit 48 to end the display processing of the intermediate image.

Subsequently, the control unit 50 controls the third image memory unit 47 and display image generating unit 48 to start the display processing of the panoramic repeated moving image after completion of the loop moving image generation processing as processing in step S71.

Figure 20:
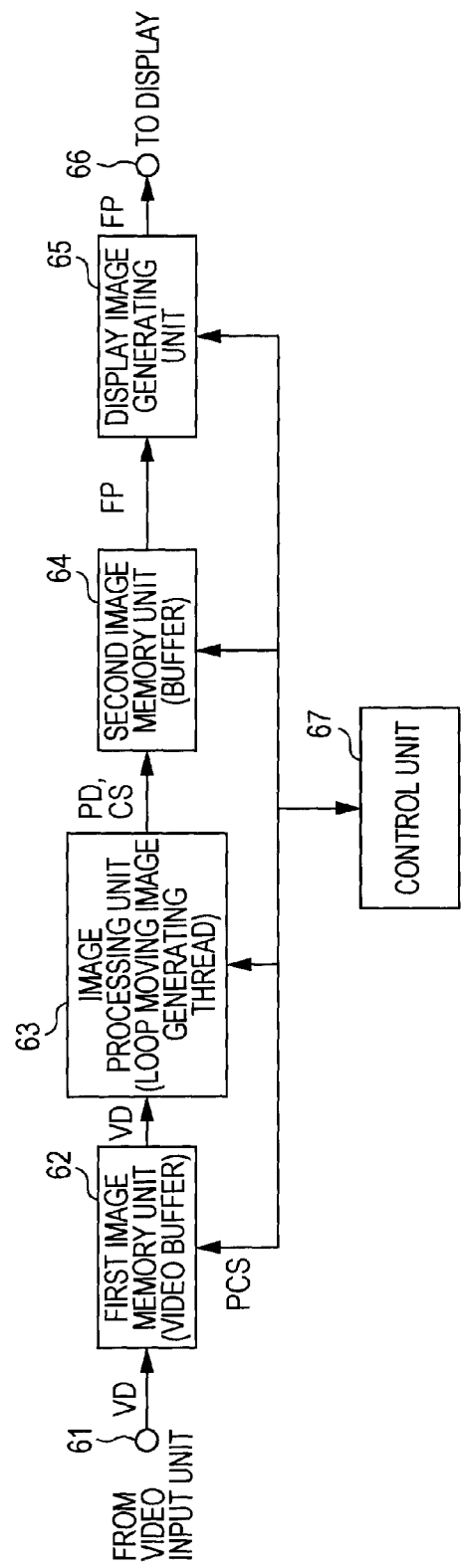
FIG. 20 is a functional block diagram illustrating the schematic configuration of principal portions according to the loop moving image generation processing for generating a repeated moving image at the time of video pause with the personal digital assistants according to the present embodiment.

Schematic Configuration of Personal Digital Assistant when Pausing Video Display to Display Repeated Moving Image FIG. 20 illustrates the schematic configuration of principal portions in the event of displaying a repeated moving image at the time of video display being paused with the personal digital assistant according to the present embodiment. Note that FIG. 20 illustrates an example using video data supplied from a camera unit or a video input unit such as a digital television broadcast reception unit or the like, as an original moving image. Also, with the configuration in FIG. 20, an image processing unit 63 and a display image generating unit 65 may be prepared as hardware, or may be configured as a calculation function unit within a CPU owing to execution of the repeated moving image generating program according to the present embodiment.

In FIG. 20, video data VD from a video input unit is supplied to an input terminal unit 61. Note that the reception units of the video data VD at the input terminal 61 may be any units such as file units, frame units, scan line units, or the like in the same way as described above. The video data VD supplied to the input terminal 61 is input to a first image memory unit 62.

The first image memory unit 62 is a ring buffer which holds certain time worth of the latest data and discards old data other than that under the writing/readout control of a control unit 67. Note that examples of the certain time include three seconds. Also, in the event that the capacity of this memory unit is sufficiently greater than the certain time worth of data capacity, old data other than the certain time worth of the latest data may also be held in an allowable range. In the case of this example, upon receiving a pause notification signal PCS from the control unit 67, the first image memory unit 62 stops updating of the buffer, and holds certain time worth of the latest video data before receiving this pause notification signal PCS. After stopping updating of the buffer by receiving the pause notification signal PCS, the first image memory unit 62 outputs the certain time worth of the held video data to an image processing unit 63 downstream.

The image processing unit 63 has a configuration for executing the aforementioned loop moving image generation processing, and performs the loop moving image generation processing using the certain time worth of the video data under the control of the control unit 67. Upon processing in certain units according to execution of the loop moving image generation processing being completed as described above, the image processing unit 63 outputs the image data PD after the processing in the certain units and the completion signal CS to the second image memory unit 64.

The second image memory unit 64 is buffer memory for frame images to be supplied to a display image generating unit 65, accumulates the data PD of the intermediate image according to the loop moving image generation processing as to the certain time worth of video data output from the image processing unit 63 upstream, under read/write control of the control unit 67, and also outputs the image data FP in frame units to the display image generating unit 65 downstream.

The display image generating unit 65 successively reads out, under the control of the control unit 67, the image data FP in frame units necessary for display indication from the second image memory unit 64, and outputs the frame image data FP thereof from an output terminal 66 to the display downstream. With the present embodiment, after the loop moving image generation processing is started, until this loop moving image generation processing is all completed, the frame image data FP of the intermediate image is output from the display image generating unit 65 to the display. Upon the loop moving image generation processing being all completed, the repeated moving image after completion of the loop moving image generation processing as to the certain time worth of video data is output from the display image generating unit 65 to the display. Thus, in the case of this example, the repeated moving image generated from the certain time worth of video data is displayed on the display screen.

Figure 21:
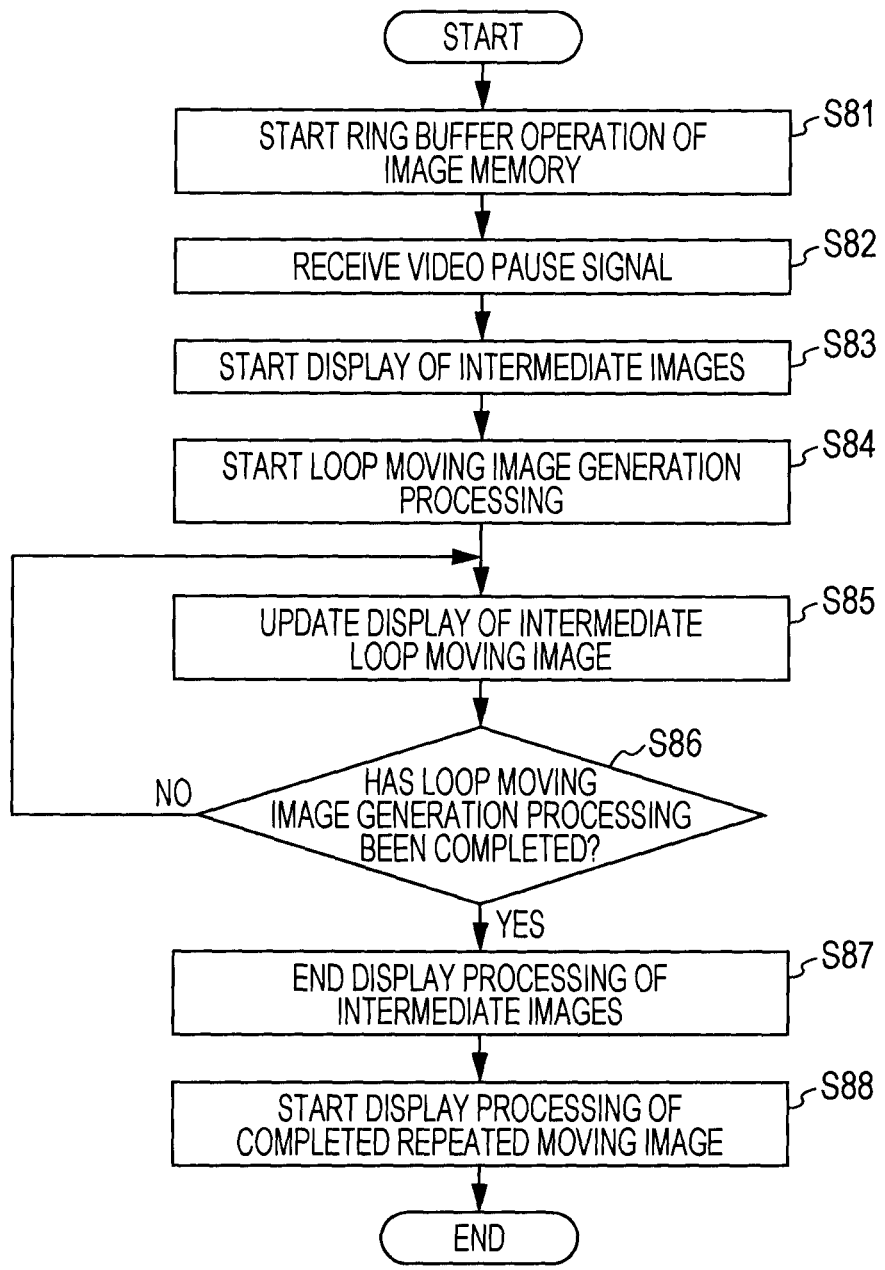
FIG. 21 is a flowchart illustrating the flow of the loop moving image generation processing for generating a repeated moving image at the time of video pause with the personal digital assistants according to the present embodiment.

Flowchart of Personal Digital Assistant when Pausing Video Display and Displaying Repeated Moving Image FIG. 21 illustrates a flowchart of processing for displaying a repeated moving image after pause with the configuration example in FIG. 20. Note that, in the case of the present embodiment, the processing of the flowchart in FIG. 21 is realized by the repeated moving image generating program according to the present embodiment being executed by the CPU.

With the flowchart in FIG. 21, the control unit 67 formed within the CPU by execution of the program according to the present embodiment controls the first image memory unit 62 to start ring buffer operation and to output the certain time worth of the latest video data VD downstream while successively holding this as processing in step S81.

For example, upon recognizing that a pause instruction operation or the like has been performed from the user, the control unit 67 generates a pause signal PCS and transmits to the first image memory unit 62, and stops updating of the ring buffer at the first image memory unit 62 as processing in step S82. The control unit 67 then outputs the certain time worth of video data before generation of the pause signal PCS from the first image memory unit 62 to the image processing unit 63.

Next, the control unit 67 controls the display image generating unit 65 to start display of the intermediate image as processing in step S83, and controls the image processing unit 63 to start the loop moving image generation processing using the certain time worth of video data as processing in step S84.

The control unit 67 controls the second image memory unit 64 and display image generating unit 65 to continue updating of display of the repeated moving image of the intermediate image according to the certain time worth of the loop moving image generation processing as processing in step S85.

In step S86, the control unit 67 determines whether or not the loop moving image generation processing has been completed, and in the event that the loop moving image generation processing has not been completed, returns the processing to step S85, and on the other hand, in the event that the loop moving image generation processing has been completed, advances the processing to step S87.

Upon proceeding to the processing in step S87, the control unit 67 controls the second image memory unit 64 and display image generating unit 65 to end the intermediate image display processing, and then to perform display of the repeated moving image by the completed loop moving image generation processing as processing in step S88.

As described above, for example, in the event that a pause instruction has been input by the user or the like, the personal digital assistant according to the present embodiment can display the repeated moving image in which the certain time worth of video data held in the first image memory unit 62 is used, before the pause thereof.

Application for Generating Panoramic Still Image from Multiple Still Images Using Loop Moving Image Generation Processing The personal digital assistant according to the present embodiment uses the position adjustment processing and blending processing of the loop moving image generation processing, thereby generating a panoramic still image from multiple still images, and also, the intermediate image in panoramic still image generation process according to this loop moving image generation processing can also be displayed.

Figure 22:
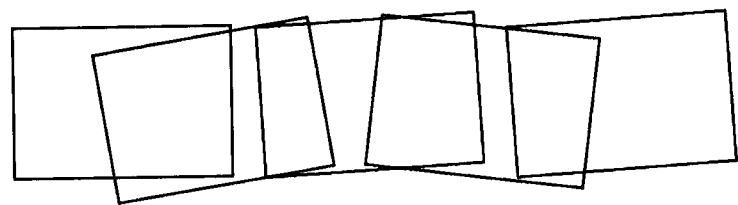
FIG. 22 is a diagram illustrating an example of the frames at the time of generating a panoramic still image using the loop moving image generation processing with the personal digital assistant according to the present embodiment.
Figure 23:
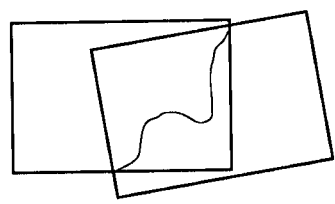
FIG. 23 is a diagram used for description of blending processing at the time of generating a panoramic still image using the loop moving image generation processing with the personal digital assistant according to the present embodiment.
Figure 24:
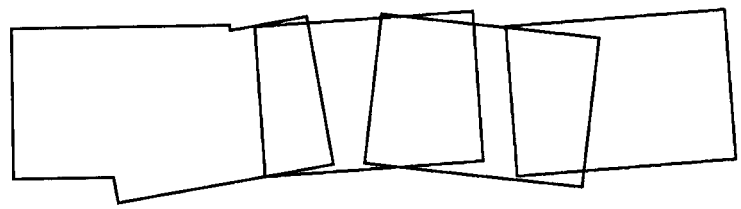
FIG. 24 is a diagram illustrating an example of a panoramic still image of which the processing has partially been completed using the loop moving image generation processing with the personal digital assistant according to the present embodiment.

Specifically, for example, as shown in FIG. 22, in the event that there are multiple still images shot while moving the camera unit in a certain direction (e.g., horizontal direction), the personal digital assistant according to the present embodiment performs matching between adjacent still images, for example, as shown in FIG. 23 regarding these still images, performs the position adjustment processing such that, of these still images, image elements generally matched by the matching are overlapped, and subjects these image elements to blending processing. The personal digital assistant according to the present embodiment then displays, as shown in FIG. 24, a scene wherein the still images are being connected by the position adjustment or blending processing or the like, on the display screen as the intermediate image.

Thus, the personal digital assistant according to the present embodiment can display a scene wherein a panoramic still image is being generated from the multiple still images, on the display screen.

Figure 25:
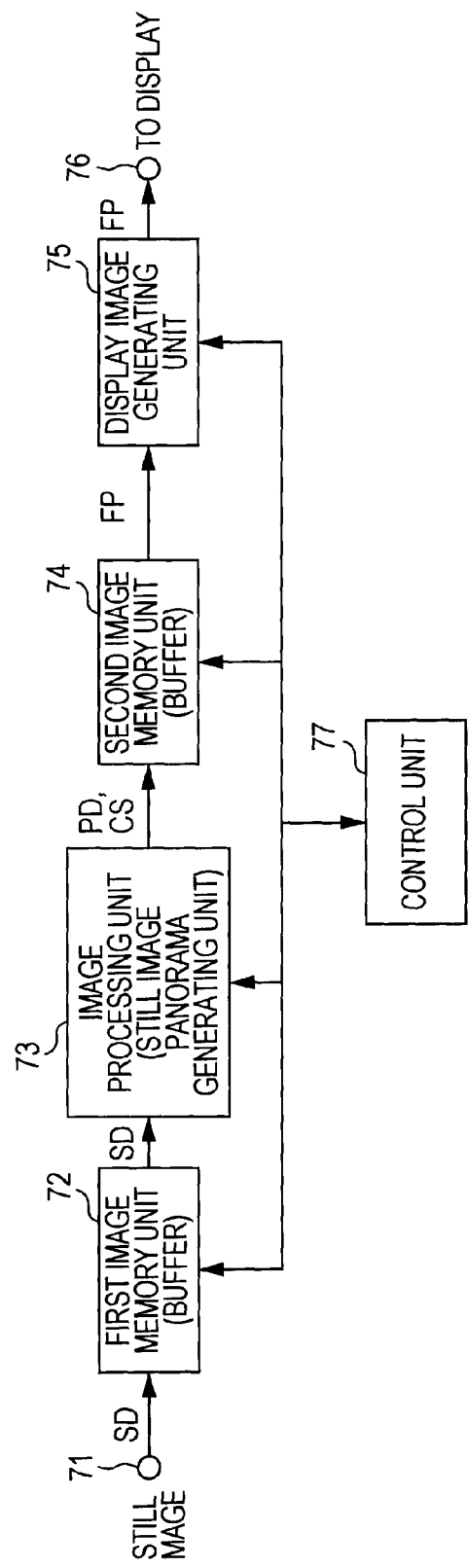
FIG. 25 is a functional block diagram illustrating the schematic configuration of principal portions according to the loop moving image generation processing for generating a panoramic still image with the personal digital assistant according to the present embodiment.

FIG. 25 illustrates the schematic configuration of principal portions in the event that a panoramic still image is generated by the loop moving image generation processing using the multiple still images, and the intermediate image of the processing thereof is displayed, with the personal digital assistant according to the present embodiment. Note that FIG. 25 illustrates an example wherein a plurality of still image data SD shot while moving the camera unit in a certain direction has been supplied to an input terminal 71 as the original moving image. Also, with the configuration in FIG. 25, an image processing unit 73 and a display image generating unit 75 may be prepared as hardware, or may be configured as a calculation function unit within a CPU owing to execution of the repeated moving image generating program according to the present embodiment.

In FIG. 25, for example, the plurality of still image data SD shot while moving the camera unit in the horizontal direction is supplied to the input terminal 71 in the shooting sequence thereof. The plurality of still image data SD supplied to the input terminal 71 is input to a first image memory unit 72.

Under the writing/readout control of a control unit 77, the first image memory unit 72 temporarily holds, in the supply sequence thereof, the still image data SD in the shooting sequence shot while moving the camera unit in the horizontal direction, and also outputs in the supply sequence thereof. The plurality of still image data SD sequentially read out from this first image memory unit 72 are sequentially input to an image processing unit 73 downstream.

The image processing unit 73 has a configuration whereby the aforementioned loop moving image generation processing can be executed, and in the case of this example, under the control of the control unit 77, performs the position adjustment processing and blending processing between adjacent still images. The image processing unit 73 takes each of the position adjustment processing and blending processing as processing in certain units, and each time this processing in certain units has been completed, outputs the image data PD after end of the processing in certain units, and completion signal CS to the second image memory unit 74.

The second image memory unit 74 is buffer memory for display frame images to be supplied to the display image generating unit 75, and under the writing/readout control of the control unit 77, accumulates the image data PD of the intermediate image after end of the processing in certain units output from the image processing unit 73 downstream, and also outputs the image data FP of the intermediate image in the display frame units to the display image generating unit 75 downstream.

The display image generating unit 75 successively reads out, under the control of the control unit 77, the image data FP of the intermediate image in frame units necessary for display indication from the second image memory unit 74, and outputs the image data FP thereof from an output terminal 76 to the display downstream.

Thus, in the case of the present embodiment, the image of a scene wherein a panoramic still image is gradually being completed each time each process in the certain units is completed, is displayed on the display screen.

Figure 26:
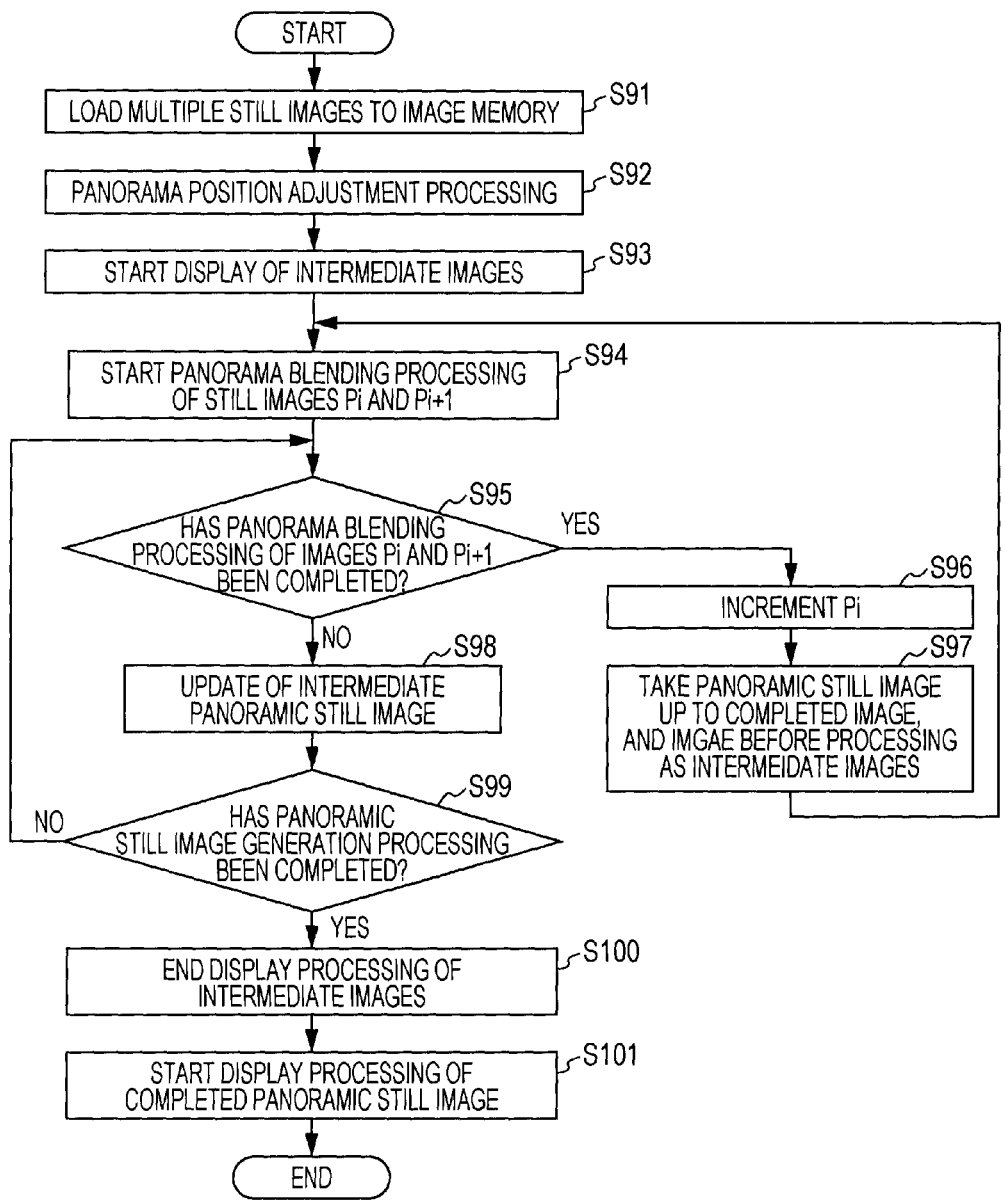
FIG. 26 is a flowchart illustrating the flow of the loop moving image generation processing for generating a panoramic still image with the personal digital assistant according to the present embodiment.

Flowchart of Personal Digital Assistant when Generating and Displaying Panoramic Still Image from Multiple Still Images Using Loop Moving Image Generation Processing FIG. 26 illustrates a flowchart of processing for generating and displaying a panoramic still image from multiple still images with the configuration example in FIG. 25. Note that, in the case of the present embodiment, the processing in the flowchart in FIG. 26 is realized by the repeated moving image generating program and panoramic image generating program according to the present embodiment being executed by the CPU.

With the flowchart in FIG. 26, the control unit 77 formed within the CPU by execution of the program according to the present embodiment sequentially loads the plurality of still image data SD to the first image memory 72 as processing in step S91, and sequentially outputs the plurality of still image data SD to the image processing unit 73, and controls this image processing unit 73 to perform the position adjustment processing such that image elements generally matched between adjacent still images are overlapped as processing in step S92.

Next, the control unit 77 controls the display image generating unit 75 to start display of the intermediate image as processing in step S93, and also controls the image processing unit 73 to start the loop moving image generation processing as to each of the still images as processing in step S94.

Specifically, first in step S94, the control unit 77 sets a variable representing each of the still images and also corresponding to the shot sequence (hereafter, referred to as still image Pi), and controls the image processing unit 73 to perform, regarding adjacent two still image Pi and still image Pi+1, the blending (mixing) processing between image elements generally matched both images as described above.

Next, the control unit 77 determines whether or not the blending processing of the adjacent still images Pi and Pi+1 by the image processing unit 73 has been completed, as processing in step S95, and in the event that determination is made that the blending processing has been completed, advances the processing to step S96, and in the event that determination is made that the blending processing has not been completed, advances the processing to step S98.

Upon proceeding to the processing in step S98, the control unit 77 controls the second image memory unit 74 and display image generating unit 75 to continue updating of display of the panoramic still image of the intermediate image by the blending processing.

In step S99, the control unit 77 determines whether or not the generation processing of the panoramic still image where all of the still images are connected has been completed, and in the event that the processing has been completed, advances the processing to step S100, and on the other hand, in the event that the processing has not been completed, returns the processing to step S95.

Also, with the determination processing in step S95, upon determining that the blending processing of the adjacent still images Pi and Pi+1 has been completed, and proceeding to the processing in step S96, the control unit 77 increments the still image Pi, and advances the processing to step S97.

Upon proceeding to the processing in step S97, the control unit 77 controls the image processing unit 73 to generate an intermediate image made up of the panoramic still image up to the images of which the blending processing has been completed, and the still images before the processing thereof and after the position adjustment, and returns the processing to step S94.

Also, upon determination being made in step S99 that the generation processing of the panoramic still image where all of the still images are connected has been completed, and proceeding to the processing in step S100, the control unit 77 controls the second image memory unit 74 and display image generating unit 75 to end the display processing of the intermediate image.

The control unit 77 then controls the second image memory unit 72 and display image generating unit 75 to start display processing of the panoramic still image where all of the still images are connected, as processing in step S101.

Application for Performing Three-dimensional Noise Reduction Processing Using Loop Moving Image Generation Processing The personal digital assistant according to the present embodiment performs overlapping processing made up of the position adjustment processing and blending processing of the loop moving image generation processing, thereby subjecting video data to three-dimensional noise reduction (NR) processing, and also the intermediate image in three-dimensional noise reduction processing process by the loop moving image generation processing can be displayed.

Figure 27:
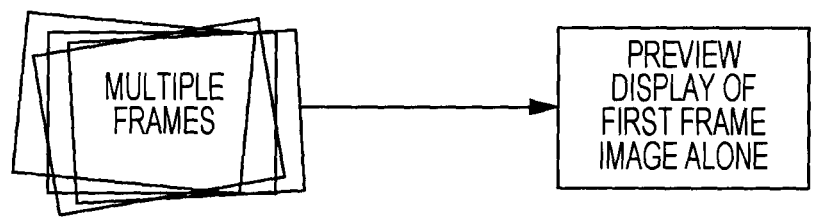
FIG. 27 is a diagram used for description of a preview image at the time of three-dimensional noise reduction processing using the loop moving image generation processing with the personal digital assistant according to the present embodiment.
Figure 28:
FIG. 28 is a diagram used for description of three-dimensional noise reduction processing using two images with the personal digital assistant according to the present embodiment.
Figure 29:
FIG. 29 is diagram used for description of three-dimensional noise reduction processing using three images with the personal digital assistant according to the present embodiment.

Specifically, for example, the personal digital assistant according to the present embodiment displays only the first one frame image of multiple frame images at the time of start of three-dimensional noise reduction as shown in FIG. 27. Next, the personal digital assistant uses, as shown in FIG. 28, two frame images to perform the position adjustment of these frame images, and then according to the overlapping processing for blending these frame images, subjects the two frame images to the three-dimensional noise reduction processing. Next, the personal digital assistant uses, as shown in FIG. 29, three frame images to perform the position adjustment of these frame images, and then according to the overlapping processing for blending these frame images, subjects the three frame images to the three-dimensional noise reduction processing.

In this way, with the personal digital assistant according to the present embodiment, an arrangement may be made wherein the three-dimensional noise reduction processing is performed while gradually increasing the number of frame images, intermediate images obtained by the processing are sequentially displayed, and after all of the processes are completed, the image after completion thereof is displayed.

Figure 30:
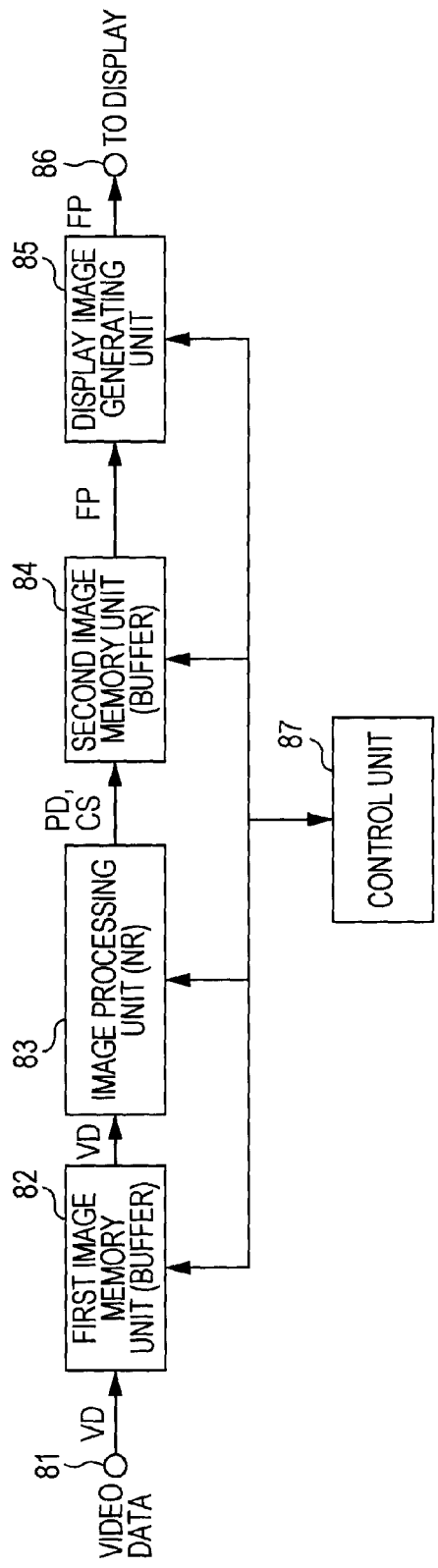
FIG. 30 is a functional block diagram illustrating the schematic configuration of principal portions according to the loop moving image generation processing for realizing three-dimensional reduction with the personal digital assistant according to the present embodiment.

FIG. 30 illustrates the schematic configuration of principal portions in the event that, with the personal digital assistant according to the present embodiment, the three-dimensional noise reduction processing is executed by the overlapping processing using the position adjustment processing and blending processing of the loop moving image generation processing, and also the intermediate image of the processing thereof is displayed. Note that this FIG. 30 illustrates an example wherein a frame image making up the video data VD has been supplied to an input terminal 81 as the original moving image. Also, with the configuration in FIG. 30, an image processing unit 83 and a display image generating unit 85 may be prepared as hardware, or may be configured as a calculation function unit within a CPU owing to execution of the repeated moving image generating program according to the present embodiment.

In FIG. 30, the input video data VD is supplied to the input terminal 81, and the input video data VD thereof is input to a first image memory unit 82.

The first image memory unit 82 temporarily holds the input video data under the writing/readout control of a control unit 87. Also, the first image memory unit 82 outputs, according to the progress of the three-dimensional noise reduction processing at the image processing unit 83 downstream, the held data thereof to this image processing unit 83.

The image processing unit 83 has a configuration whereby the aforementioned loop moving image generation processing can be executed. In the case of this example, the image processing unit 83 performs, under the control of the control unit 87, the three-dimensional noise reduction processing for overlapping multiple frame images such as two or three or the like after the aforementioned position adjustment. Each of the position adjustment processing and overlapping processing is taken as processing in certain units, and each time this processing in certain units is completed, the image processing unit 83 outputs the image data PD after the processing in certain units thereof and the completion signal CS to a second image memory unit 84.

The second image memory unit 84 is buffer memory for display frame images to be supplied to the display image generating unit 85, and under the writing/readout control of the control unit 87, accumulate the image data PD of the intermediate image after end of the processing in certain units output from the image processing unit 83 downstream, and also outputs the image data FP of the intermediate image in the display frame units to the display image generating unit 85 downstream.

The display image generating unit 85 successively reads out, under the control of the control unit 87, the image data FP of the intermediate image in frame units necessary for display indication from the second image memory unit 84, and outputs the image data FP thereof from an output terminal 86 to the display downstream.

Thus, in the case of the present embodiment, the image of a scene wherein an image subjected to the three-dimensional noise reduction is gradually being completed each time each process in certain units is completed, is displayed on the display screen.

Figure 31:
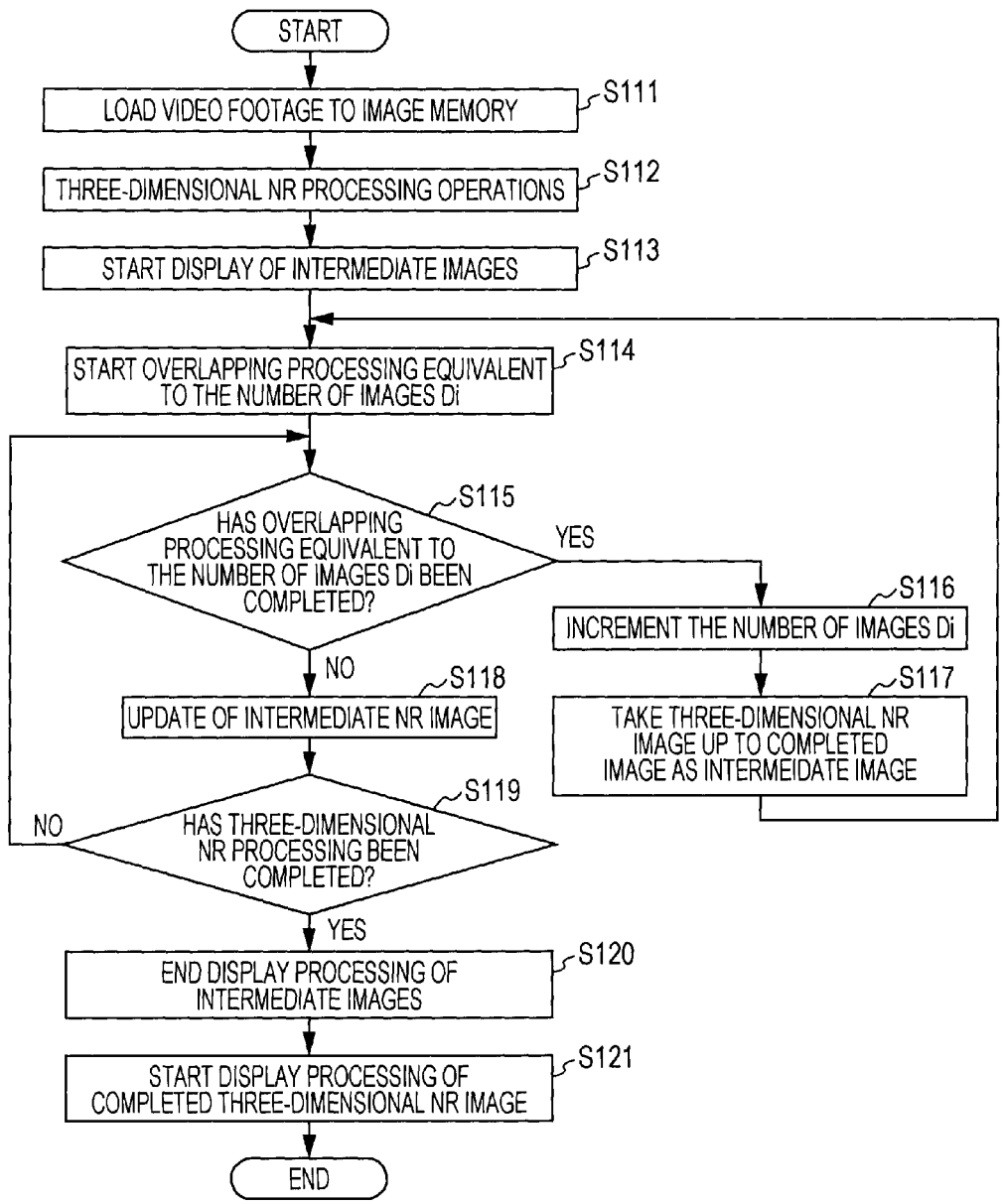
FIG. 31 is a flowchart illustrating the flow of the loop moving image generation processing for realizing three-dimensional reduction with the personal digital assistant according to the present embodiment.

Flowchart of Personal Digital Assistant when Generating and Displaying Image Subjected to Three-Dimensional Noise Reduction Processing Using Loop Moving Image Generation Processing FIG. 31 illustrates a flowchart of processing for generating and displaying an image according to the three-dimensional noise reduction processing with the configuration example in FIG. 30. Note that, in the case of the present embodiment, the processing in the flowchart in FIG. 31 is realized by the repeated moving image generating program according to the present embodiment being executed by the CPU.

With the flowchart in FIG. 31, the control unit 87 formed within the CPU by execution of the program according to the present embodiment loads the input video data VD to the first image memory unit 82 as processing in step S111.

Next, in the event that an execution instruction for the three-dimensional noise reduction processing has been performed, for example, by instruction operations from the user or the like as processing in step S112, the control unit 87 controls the display image generating unit 85 to start display of the intermediate image as processing in step S113, and also controls the image processing unit 83 to start the overlapping processing by the position adjustment processing and blending processing of the loop moving image generation processing as processing in step S114.

Specifically, first in step S114, the control unit 87 sets a variable corresponding to the number of overlapped frame images (hereafter, referred to as the number of images Di), and controls the image processing unit 83 to execute the position adjustment and blending processing regarding each of the frame images of which the number is indicated with the number of images Di.

Next, the control unit 87 determines as processing in step S115 whether or not the overlapping processing of the number of images Di by the image processing unit 83 has been completed, and in the event that the processing has been completed, advances the processing to step S116, and in the event that the processing has not been completed, advances the processing to step S118.

Upon proceeding to step S118, the control unit 87 controls the second image memory unit 84 and display image generating unit 85 to continue updating of display of the intermediate image according to the three-dimensional noise reduction processing of the overlapping processing.

In step S119, the control unit 87 determines whether or not the whole of the three-dimensional noise reduction processing has been completed, and in the event that the processing has been completed, advances the processing to step S120, and on the other hand, in the event that the processing has not been completed, returns the processing to step S115.

Also, with the determination processing in step S115, upon determining that the overlapping processing equivalent to the number of images Di has been completed, and proceeding to step S116, the control unit 87 increments the number of images Di, and advances the processing to step S117.

Upon proceeding to the processing in step S117, the control unit 87 controls the image processing unit 83 to generate an intermediate image up to completion of the three-dimensional noise reduction processing, and returns the processing to step S114.

Also, upon determining that the whole of the three-dimensional noise reduction processing has be completed in step S119, and proceeding to the processing in step S120, the control unit 87 controls the second image memory unit 84 and display image generating unit 85 to end the display processing of the intermediate image.

Subsequently, the control unit 87 controls the second image memory unit 84 and display image generating unit 85 to start display processing of an image of which the whole of the three-dimensional noise reduction processing has been completed, as processing in step S121.

Figure 32:
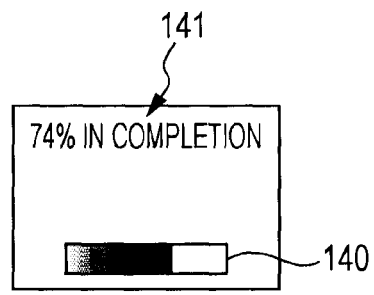
FIG. 32 is a diagram illustrating an example of screen display for allowing a user to recognize the progress situation of the loop moving image generation processing using, for example, the gauge and % display of an indicator with the personal digital assistant according to the present embodiment.
Figure 33:
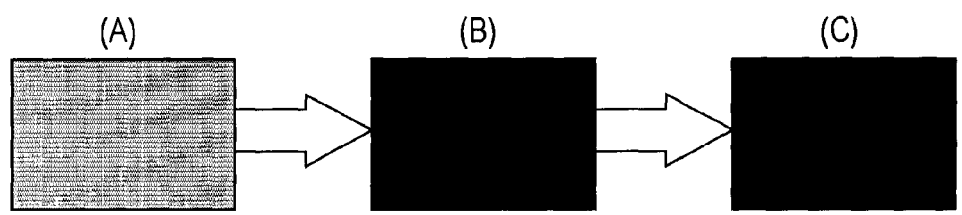
FIG. 33 is a diagram illustrating an example of screen display for allowing the user to recognize the progress situation of the loop moving image generation processing using, for example, change in display shading or transparency with the personal digital assistant according to the present embodiment.
Figure 34:
FIG. 34 is a diagram illustrating an example of screen display for allowing the user to recognize completion of the loop moving image generation processing with the personal digital assistant according to the present embodiment.

Screen Example Showing User During Loop Moving Image Generation Processing and Completion Thereof FIG. 32 through FIG. 34 illustrate, in the event that with the above-mentioned embodiments, during the loop moving image generation processing or the processing thereof has been completed, a screen example for expressly providing this to the user.

FIG. 32 illustrates an example in the event of expressly providing the degree of progress of the loop moving image generation processing to the user using the gauge progress of an indicator 140, and a numeric value 141 of % display on the display screen, for example.

FIG. 33 illustrates an example in the event of expressly providing the progress state of the loop moving image generation processing to the user using effect display such as changing the display shading or transparency of the display screen. Specifically, with the example in FIG. 33, as shown in a display screen example in (A) in the drawing, at the time of start of the processing, screen display concentration thereof is reduced, and during the progress of the processing, as shown in (B) in the drawing, screen display concentration is gradually increased, and at the time of the processing being completed, as shown in (C) in the drawing, screen display concentration is increased at a maximum.

FIG. 34 illustrates an example in the event of displaying a message 142 for expressly providing, at the time of the loop moving image generation processing being completed, the user that the processing has been completed, on the display screen. Note that the user may be notified of completion of the processing, for example, by playing the sounds, or activating a vibrator.

Figure 35:
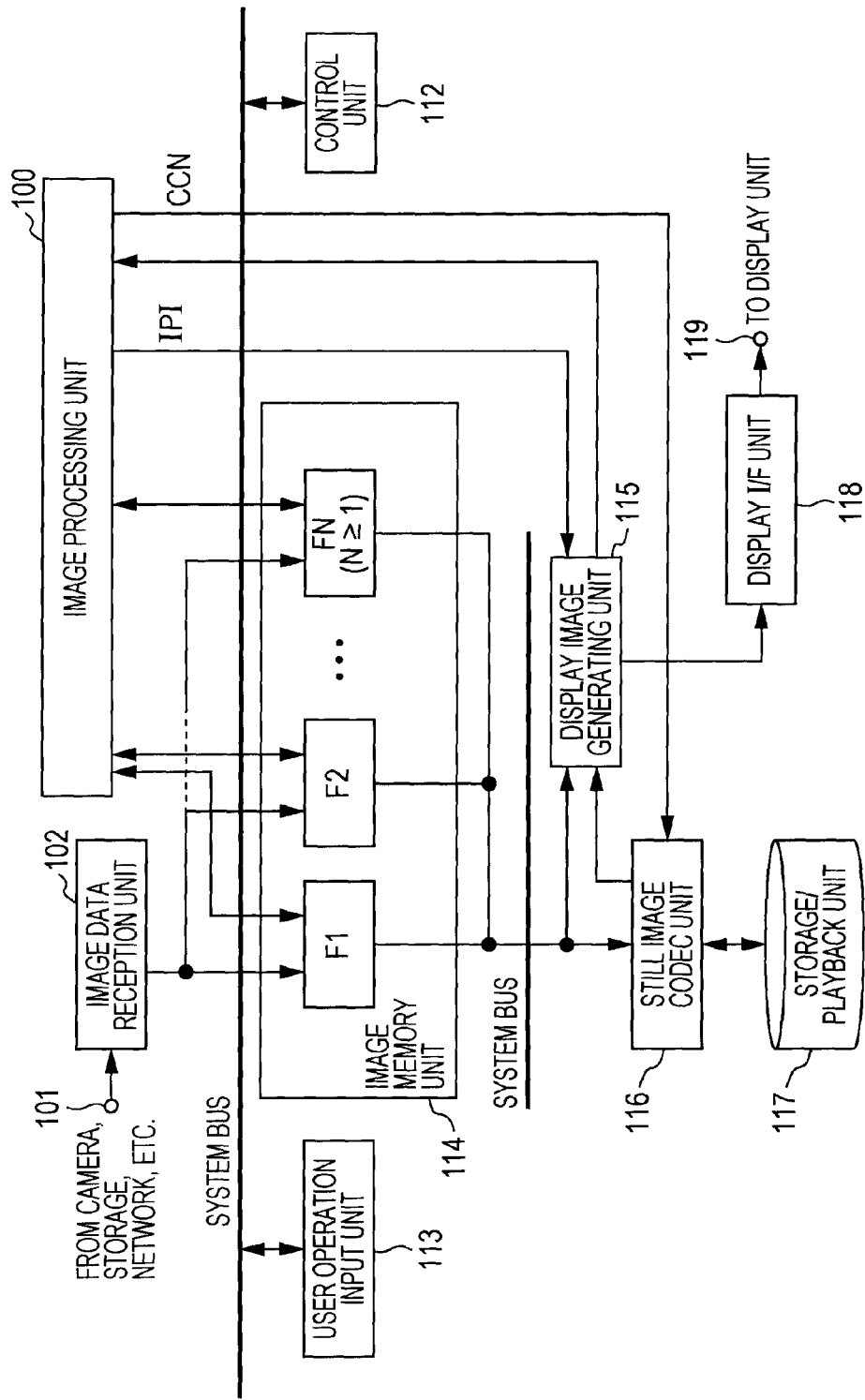
FIG. 35 is a block diagram illustrating a detailed configuration example of the personal digital assistant according to the present embodiment whereby an intermediate image obtained by predetermined image processing such as the loop moving image generation processing or the like can be displayed on the display screen.

Detailed Configuration of Personal Digital Assistant for Displaying Intermediate Image During Image Processing FIG. 35 illustrates a detailed configuration example of a personal digital assistant whereby an intermediate image obtained by predetermined image processing, for example, such as the loop moving image generation processing such as described in the above-mentioned embodiments can be displayed on the display screen.

In FIG. 35, video data or the like is supplied to an input terminal 101 from the above-mentioned camera unit or a network, a storage device, or the like. The video data or the like supplied to this input terminal 101 is received at an image data reception unit 102.

The image data reception unit 102 converts the data supplied from the input terminal 101 into a data format that can be handled within this personal digital assistant. Also, the image data reception unit 102 transmits this converted data to an image memory unit 114 under the control of a control unit 112.

The image memory unit 114 is equivalent to, for example, the above-mentioned first image memory unit, second image memory unit, and third image memory unit, and under the control of the control unit 112, temporarily stores the input video data converted by the image data reception unit 102, and also performs storing of the intermediate image, or storing of data to be displayed on the display, or the like.

A user operation input unit 113 is operated by the user who handles the personal digital assistant according to the present embodiment to accept, for example, such as described above, standby background setting operation instruction input, a thumbnail image display instruction input, three-dimensional noise reduction processing instruction input, or the like from the user. The user instruction input signal input to this user operation unit 113 is transmitted to the control unit 112 via a system bus. Thus, the control unit 112 recognizes that, for example, such as descried above, a standby background setting operation instruction, a thumbnail image display instruction, a three-dimensional noise reduction processing instruction, or the like has been input from the user, and according to the input instruction thereof from the user, each unit can be controlled as described above.

An image processing unit 100 reads out, under the control of the control unit 112, the data from the image memory unit 114, subjects to predetermined image processing, for example, such as the above-mentioned loop moving image generation processing or the like, and then writes the data after this processing back to the image memory unit 114. Also, while outputting the data of the intermediate image of the predetermined image processing to the image memory unit 114, the image processing unit 100 notifies the display image generating unit 115 of information IPI necessary for display of the intermediate image thereof. Upon the whole of the image processing being completed, the image processing unit 100 temporarily stores the data after completion of this image processing in the image memory unit 114, and also transmits a generation processing completion notice CCN indicating that the image processing has been completed, to a still image codec unit 116.

Upon receiving the generation processing completion notice CCN from the image processing unit 100, the still image codec unit 116 reads out, under the control of the control unit 112, the data after completion of the image processing from the image memory unit 114, and stores the data thereof in a storage/playback unit 117 such as built-in memory or the like, for example.

At the time of the image processing being performed at the image processing unit 100, under the control of the control unit 112, the display image generating unit 115 reads out the data of the intermediate image from the image memory unit 114 to generate a frame image to be displayed on the display. Also, the display image generating unit 115 notifies the image processing unit 100 of the temporal position of a frame displayed on the display at the current time point. Further, after the processing by the image processing unit 100 is completed, under the control of the control unit 112, the display image generating unit 115 reads out the data after completion of the image processing from the storage/playback unit 117 via the still image codec unit 116, and generates a frame image to be displayed on the display form the data thereof.

A display interface unit 118 converts the data of a display frame supplied from the display image generating unit 115 according to the specifications of a display device connected to this personal digital assistant, and outputs the converted data to the display device via an output terminal 119.

The control unit 112 controls the operation of the whole of the personal digital assistant according to the present embodiment along with control of the above-mentioned components, and also performs various types of calculation processing according to need.

Figure 36:
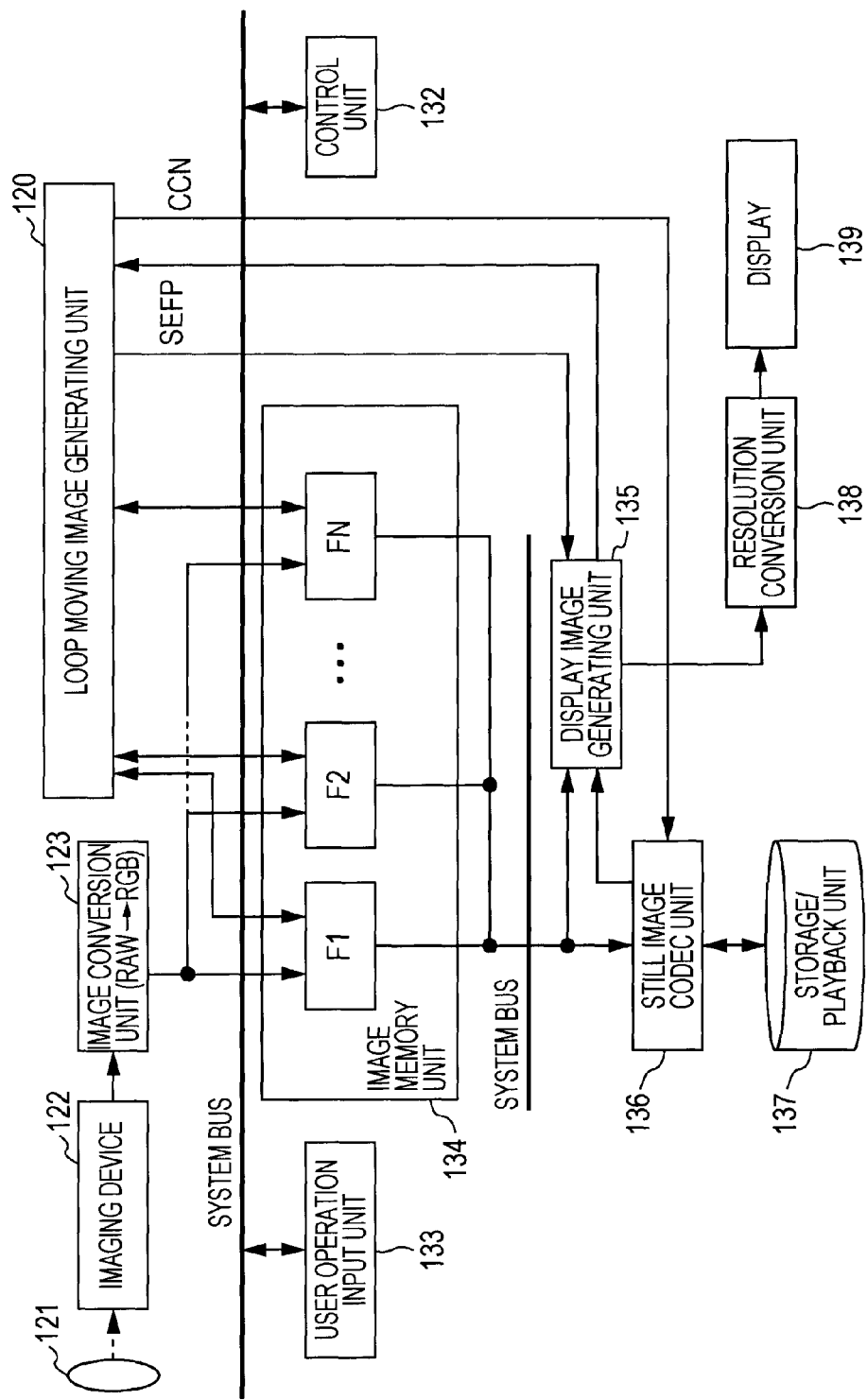
FIG. 36 is a block diagram illustrating a specific configuration example of the personal digital assistant according to the present embodiment in the event of generating and displaying a repeated moving image using, for example, video data taken by a camera unit as an original moving image.

Specific Configuration of Personal Digital Assistant for Generating and Displaying Repeated Moving Image from Video Data Taken by Camera FIG. 36 illustrates, of the above-mentioned embodiments, a specific configuration example of a personal digital assistant in the event of generating and displaying a repeating moving image using, for example, video data taken by the camera unit as the original moving image.

In this FIG. 36, a configuration from a lens 121 to an image conversion unit 123 is a principal configuration of the camera unit described above. The lens 121 forms a subject image and a background image thereof and so forth on the imaging surface of an imaging device 122. The imaging device 122 subjects the subject image and the background image thereof and so forth formed on the imaging surface thereof to photo-electric conversion to generate RAW (raw) data, and outputs this RAW data to the image conversion unit 123. The image conversion unit 123 is an example of the image data reception unit 102, converts the RAW data into data of R (red), G (green), and B (blue). Note that an RGB filter and so forth are provided to the front surface of the imaging device 122, but these drawings are omitted in FIG. 36. The RGB data output from the image conversion unit 123 is transmitted to an image memory unit 134.

The image memory unit 134 is equivalent to, for example, the first image memory unit, second image memory unit, third image memory unit, and so forth in the above-mentioned FIG. 5, FIG. 11, FIG. 18, and others, and under the control of the control unit 132, temporarily stores the RGB data from the image conversion unit 123, and also performs storing of the intermediate image, storing of data to be displayed on the display, and so forth.

A user operation input unit 133 is operated by the user who handles the personal digital assistant according to the present embodiment to accept, for example, such as described above, instruction input of a standby background setting operation, a slide show image start operation due to change in the frame rate, a panoramic repeated moving image start operation, or the like. The user instruction input signal input to this user operation input unit 133 is transmitted to the control unit 132 via a system bus. Thus, the control unit 132 recognizes that, for example, such as descried above, a standby background setting operation instruction, a slide show image start instruction due to change in the frame rate, a panoramic repeated moving image start instruction, or the like has been input from the user, and according to the input instruction thereof from the user, each unit can be controlled as described above.

A loop moving image generating unit 120 is equivalent to the image processing units according to the above-mentioned embodiments, and under the control of the control unit 132, reads out data from the image memory unit 134, and performs the position adjustment processing, optimal repeated section detection processing, looping processing, blending processing, or the like of the loop moving image generation processing. The loop moving image generating unit 120 updates the image for each frame from the start of input video data at the time of the position adjustment processing, and notifies the display image generating unit 135 of the start and end frame positions the repeated section at the time of the optimal repeated section detection processing and looping processing. Also, the loop moving image generating unit 120 updates the image for each frame from the start position to be subjected to the blending processing at the time of the blending processing. Note that at the time of updating a frame image, this is performed after confirming that this frame image is not a frame displayed on the current display. The loop moving image generating unit 120 writes the data after such loop moving image generation processing back to the image memory unit 134. Also, while outputting the data of the intermediate image according to the loop moving image generation processing to the image memory unit 134, the loop moving image generating unit 120 notifies the display image generating unit 135 of information SEFP indication the start and end frame positions of the repeated section as information necessary for display of the intermediate image thereof. Upon the whole of the loop moving image generation processing being completed, the loop moving image generating unit 120 temporarily stores data after completion of this processing in the image memory unit 134, and also transmits the generation processing completion notice CCN indicating that this processing has been completed to a still image codec unit 136.

Upon receiving the generation processing completion notice CCN from the loop moving image generating unit 120, the still image codec unit 136 reads out, under the control of the control unit 132, data after completion of the loop moving image generation processing from the image memory unit 134, and stores the data thereof in a storage/playback unit 137 such as built-in memory or the like, for example.

The display image generating unit 135 repeatedly reads out, under the control of the control unit 132, the data of a frame image F1 through a frame image FN from the image memory unit 134 immediately after start of the loop moving image generation processing by the loop moving image generating unit 120, and generates a frame image to be displayed on the display. Also, the display image generating unit 135 reads out the data of the intermediate image from the start frame to the end frame in the optimal repeated section from the image memory unit 134 after the looping processing of the loop moving image generation processing is completed at the loop moving image generating unit 120, and generates a frame image to be displayed on the display. Note that the display image generating unit 135 notifies the loop moving image generating unit 120 of the temporal position of a frame displayed on the display at the current time point. Further, after the whole of the processing by the loop moving image generating unit 120 is completed, the display image generating unit 135 reads out, under the control of the control unit 132, data after completion of the loop moving image generation processing from the storage/playback unit 137 via the still image codec unit 136, and generates a frame image to be displayed on the display from the data thereof.

A resolution conversion unit 138 is equivalent to the display interface unit 118, converts the data of the display frame image supplied from the display image generating unit 135 according to the resolution specifications of a display device 139 connected to this personal digital assistant, and outputs data after conversion thereof to the display device 139.

The control unit 132 performs control of the above-mentioned components, and also controls the operation of the whole of the personal digital assistant according to the present embodiment, and performs various types of calculation processing according to need.

General Overview

As described above, a display imaged generating method according to an embodiment of the present disclosure includes: a step causing an image data reception unit to receive a plurality of image data that temporally and/or spatially continue; a step causing an image processing unit to generate a group of processed images temporally and/or spatially connected from the received plurality of image data that temporally and/or spatially continue; a step causing a display image generating unit to perform displaying the received temporally and/or spatially continuous plurality of image data on a screen at the time of starting generation of the group of processed images by the image processing unit; a step causing a display image generating unit to perform continuously displaying, at the time of an intermediate processed image being generated during generation process of the group of processed images by the image processing unit, this intermediate processed image on a screen; and a step causing a display image generating unit to perform continuously displaying, after generation of the group of processed images by the image processing unit is completed, the group of processed images after completion of this generation on the screen.

Also, with the display image generating method according to the present embodiment, when the received each image data is temporally continuous image data, the image processing unit performs: a step for extracting two similar images from the plurality of temporally continuous images, and a plurality of temporally continuous images between these two images; a step for taking a temporally previous image of the two similar images as a first image, taking a temporally subsequent image as a rear-most image, and connecting the first image and rear-most image; and a step for generating a loop image made up of the first image and rear-most image, and a plurality of temporally continuous images between these two images as the group of processed images.

Also, with the display image generating method according to the present embodiment, when the received each image data is temporally continuous image data, an image processing unit performs: a step for extracting two similar small images and a plurality of temporally continuous small images between these two small images from small images clipped from the plurality of temporally continuous images, or small images reduced from the plurality of images; a step for taking a temporally previous small image of the two similar small images as a first small image, taking a temporally subsequent small image as a rear-most small image, and connecting the first small image and rear-most small image; and a step for generating a loop image made up of the first small image and rear-most small image, and a plurality of temporally continuous small images between these two small images as the group of processed images.

Also, with the display image generating method according to the present embodiment, when the received each image data is temporally continuous image data, the image processing unit performs: a step for successively performing a process for extracting a plurality of images for each predetermined time interval from the received plurality of temporally continuous images while changing the predetermined time interval; a step for extracting two similar images and a plurality of temporally continuous images between these two images from a plurality of images for each of the extracting processes; a step for taking a temporally previous image of the two similar images as a first image, taking a temporally subsequent image as a rear-most image, and connecting the first image and rear-most image; and a step for generating a loop image made up of the first image and rear-most image, and a plurality of temporally continuous images between these two images as the group of processed images.

Note that, in this case, with the display image generating method according to the present embodiment, the predetermined time interval is successively reduced, and at the time of generation of the group of processed images being completed, matches a time interval when the image data reception unit receives the plurality of image data.

Also, with the display image generating method according to the present embodiment, when the received each image data is temporally continuous image data, the image processing unit performs: a step for extracting a plurality of images that continue for a certain period from a plurality of the temporally continuous images; a step for connecting a first image and a temporally rear-most image of the plurality of images that continue for a certain period; and a step for generating a loop image made up of the first image and rear-most image, and a plurality of images that temporally continue between these two images as the group of processed images.

Also, with the display image generating method according to the present embodiment, when the received each image data is temporally and spatially continuous image data, causing the image processing unit performs: a step for extracting an image portion in a temporally and spatially overlapped range from each of the temporally and spatially continuous images; a step for connecting a temporally previous image portion and a temporally subsequent image portion of the image portions in the temporally and spatially overlapped range; and a step for generating a loop image made up of the temporally previous image portion, temporally subsequent image portion, and the image portions that temporally and spatially continue between these two image portions as the group of processed images.

Also, with the display image generating method according to the present embodiment, when the received each image data is temporally continuous image data, the image processing unit performs: a step for generating images connected by overlapping each of the spatially continuous images with a spatially overlapped image portion, as the group of processed images.

Also, with the display image generating method according to the present embodiment, the image processing unit performs: a step for generating an image with which each of the temporally and/or spatially continuous images is overlapped, as the group of processed images.

Also, the display image generating method according to the present embodiment includes, after generation of the group of processed images by the image processing unit is completed, a step for storing the group of processed image data after completion of this generation in a storage unit, and a step for causing the display image generating unit to continuously display the group of processed image data read out from the storage unit on a screen.

Next, a display image generating device according to an embodiment of the present disclosure includes: an image data reception unit configured to receive a plurality of image data that temporally and/or spatially continue; an image processing unit configured to generate a group of processed images temporally and/or spatially connected from the received plurality of image data that temporally and/or spatially continue; and a display image generating unit configured to perform displaying the received temporally and/or spatially continuous plurality of image data on a screen at the time of starting generation of the group of processed images by the image processing unit, continuously displaying, at the time of an intermediate processed image being generated during generation process of the group of processed images by the image processing unit, this intermediate processed image on a screen, and continuously displaying, after generation of the group of processed images by the image processing unit is completed, the group of processed images after completion of this generation on the screen.

Here, with the display image generating device according to the present embodiment, when the received each image data is temporally continuous image data, the image processing unit performs: extracting two similar images from the plurality of temporally continuous images, and a plurality of temporally continuous images between these two images; taking a temporally previous image of the two similar images as a first image, taking a temporally subsequent image as a rear-most image, and connecting the first image and rear-most image; and generating a loop image made up of the first image and rear-most image, and a plurality of temporally continuous images between these two images as the group of processed images.

Also, with the display image generating device according to the present embodiment, when the received each image data is temporally continuous image data, an image processing unit performs: extracting two similar small images and a plurality of temporally continuous small images between these two small images from small images clipped from the plurality of temporally continuous images, or small images reduced from the plurality of images; taking a temporally previous small image of the two similar small images as a first small image, taking a temporally subsequent small image as a rear-most small image, and connecting the first small image and rear-most small image; and generating a loop image made up of the first small image and rear-most small image, and a plurality of temporally continuous small images between these two small images as the group of processed images.

Also, with the display image generating device according to the present embodiment, when the received each image data is temporally continuous image data, the image processing unit performs: successively performing a process for extracting a plurality of images for each predetermined time interval from the received plurality of temporally continuous images while changing the predetermined time interval; extracting two similar images and a plurality of temporally continuous images between these two images from a plurality of images for each of the extracting processes; taking a temporally previous image of the two similar images as a first image, taking a temporally subsequent image as a rear-most image, and connecting the first image and rear-most image; and generating a loop image made up of the first image and rear-most image, and a plurality of temporally continuous images between these two images as the group of processed images.

Note that, in this case, the predetermined time interval is successively reduced, and at the time of generation of the group of processed images being completed, matches a time interval when the image data reception unit receives the plurality of image data.

Also, with the display image generating device according to the present embodiment, when the received each image data is temporally continuous image data, the image processing unit performs: extracting a plurality of images that continue for a certain period from a plurality of the temporally continuous images; connecting a first image and a temporally rear-most image of the plurality of images that continue for a certain period; and generating a loop image made up of the first image and rear-most image, and a plurality of images that temporally continue between these two images as the group of processed images.

Also, with the display image generating device according to the present embodiment, when the received each image data is temporally and spatially continuous image data, the image processing unit performs: extracting an image portion in a temporally and spatially overlapped range from each of the temporally and spatially continuous images; connecting a temporally previous image portion and a temporally subsequent image portion of the image portions in the temporally and spatially overlapped range; and generating a loop image made up of the temporally previous image portion, temporally subsequent image portion, and the image portions that temporally and spatially continue between these two image portions as the group of processed images.

Also, with the display image generating device according to the present embodiment, when the received each image data is temporally continuous image data, the image processing unit performs: generating images connected by overlapping each of the spatially continuous images with a spatially overlapped image portion, as the group of processed images.

Also, with the display image generating device according to the present embodiment, the image processing unit performs: generating an image with which each of the temporally and/or spatially continuous images is overlapped, as the group of processed images.

Also, with the display image generating device according to the present embodiment, after generation of the group of processed images by the image processing unit is completed, the group of processed image data after completion of this generation is stored in a storage unit, and the display image generating unit continuously displays the group of processed image data read out from the storage unit on a screen.

Further, the display image generating program (repeated moving image generating program) according to the present embodiment causes the computer to serve as: an image data reception unit configured to receive a plurality of image data that temporally and/or spatially continue; an image processing unit configured to generate a group of processed images temporally and/or spatially connected from the received plurality of image data that temporally and/or spatially continue; and a display image generating unit configured to perform displaying the received temporally and/or spatially continuous plurality of image data on a screen at the time of starting generation of the group of processed images by the image processing unit, continuously displaying, at the time of an intermediate processed image being generated during generation process of the group of processed images by the image processing unit, this intermediate processed image on a screen, and continuously displaying, after generation of the group of processed images by the image processing unit is completed, the group of processed images after completion of this generation on the screen.

Further, the storage medium according to the present embodiment is configured to store the display image generating program causes the computer to serve as: an image data reception unit configured to receive a plurality of image data that temporally and/or spatially continue; an image processing unit configured to generate a group of processed images temporally and/or spatially connected from the received plurality of image data that temporally and/or spatially continue; and a display image generating unit configured to perform displaying the received temporally and/or spatially continuous plurality of image data on a screen at the time of starting generation of the group of processed images by the image processing unit, continuously displaying, at the time of an intermediate processed image being generated during generation process of the group of processed images by the image processing unit, this intermediate processed image on a screen, and continuously displaying, after generation of the group of processed images by the image processing unit is completed, the group of processed images after completion of this generation on the screen.

Therefore, with the present embodiment, for example, in the event that a repeated moving image is generated and displayed from a several-second moving image having a motion obtained by shooting or the like, time-consuming processing is performed in the background while playing a repeated moving image such as an intermediate image or the like, whereby display of this repeated image can be displayed generally in real time from start of generation of the repeated image even with a device of which the processing capacity is somewhat low. Also, according to the present embodiment, processing efficiency can be improved at the time of creating and displaying a several-second repeated moving image having a motion for a standby screen of a portable telephone terminal or a so-called digital photo frame for example (e.g., a scene where ripples come near, and a scene where the leaves of a tree are dancing in the wind), and processing waiting time after shooting can be eliminated, for example.

Note that the personal digital assistant according to the present embodiment may be applied to, in addition to high-performance portable telephone terminals, tablet terminals, and slate PCs, not only portable terminals, for example, such as so-called PDAs (Personal Digital Assistants), notebook-sized personal computers, portable game machines, portable navigation terminals, and so forth, but also various stationary electronic devices, as long as the device includes a display panel capable of displaying images.

Also, the description of the above embodiment is an example of the present disclosure. Accordingly, the present disclosure is not restricted to the above-described embodiment, and various modifications can be made according to a design or the like without departing from the technical idea relating to the present disclosure.

Further, it is apparent that one skilled in the art can conceive various modifications, combinations, and other embodiments due to a design or other elements within the scope of the Claims of the present disclosure or equivalent to the Claims.

The invention claimed is:

1. An image processing apparatus comprising:
   an input terminal that receives a plurality of image units that are temporally or spatially continuous;
   an image processing unit that performs image processing on the plurality of image units by iteratively performing the image processing on subsets of the plurality of image units; and
   a display image generating unit that controls a display to
      display the plurality of image units when the image processing unit begins performing the image processing on the plurality of image units;
      display, at a time of a completion of intermediate processing of a subset of the plurality of image units by the image processing unit, an intermediate processed image including the processed subset of the plurality of image units; and
      display, after completion of the processing of the plurality of image units by the image processing unit, a complete processed image including the processed plurality of image units, wherein
   the processing performed by the image processing unit on the plurality of image units includes
      extracting two similar image units having a minimum integral sum of absolute difference value from the plurality of image units, and a plurality of temporally continuous image units between the two similar image units;
      taking a temporally previous image unit of the two similar image units as a first image unit, taking a temporally subsequent image unit as a rear-most image unit, and connecting the first image unit and rear-most image unit; and
      generating a loop image made up of the first image unit and rear-most image unit, and a plurality of temporally continuous image units between the first image unit and the rear-most image unit as a processed subset of the plurality of image units.

2. The image processing apparatus of claim 1, further comprising:
   a first image memory unit that stores the plurality of image units output from the input terminal.

3. The image processing apparatus of claim 1, wherein the processing performed by the image processing unit on the plurality of image units comprises:
   extracting two similar small images and a plurality of temporally continuous small images between the two small images from small images clipped from the plurality of image units, or small images reduced from the plurality of image units;
   taking a temporally previous small image of the two similar small images as a first small image, taking a temporally subsequent small image as a rear-most small image, and connecting the first small image and rear-most small image; and
   generating a loop image made up of the first small image and rear-most small image, and a plurality of temporally continuous small images between the first small image and rear-most small image as a processed subset of the plurality of image units.

4. The image processing apparatus of claim 1, wherein the processing performed by the image processing unit on the plurality of image units comprises:
   extracting a subset of the plurality of image units that continue for a certain period from the plurality of the image units;
   connecting a first image unit and a temporally rear-most image unit of the subset of the plurality of image units that continue for the certain period; and
   generating a loop image made up of the first image unit and rear-most image unit, and a plurality of image units that temporally continue between the first image unit and the rear-most image unit as a processed subset of the plurality of image units.

5. The image processing apparatus of claim 1, wherein connecting the first image unit and the rear-most image unit includes performing a blending process on the first image unit and the rear-most image unit.

6. The image processing apparatus of claim 1, wherein extracting the two similar image units includes calculating a sum of absolute difference values of each of the plurality of image units and integrating the calculated sum of absolute difference values with a weight to obtain an integral sum of absolute difference value.

7. The image processing apparatus of claim 1, wherein the processing performed by the image processing unit on the plurality of image units comprises:
   successively performing a process for extracting a subset of the plurality of image units for each predetermined time interval from the plurality of image units while changing the predetermined time interval;

extracting two similar image units and a plurality of temporally continuous image units between the two similar image units from the subset of the plurality of image units for each of the extracting processes;

taking a temporally previous image unit of the two similar image units as a first image unit, taking a temporally subsequent image unit as a rear-most image unit, and connecting the first image unit and the rear-most image unit; and generating a loop image made up of the first image unit and rear-most image unit, and a plurality of temporally continuous image units between the first image unit and the rear- most image unit as a processed subset of the plurality of image units.

8. The information processing apparatus of claim 7, wherein the predetermined time interval is successively reduced for each iterative processing of the subsets of the plurality of image units, and at a time that the processing of the plurality of image units is completed by the image processing unit, matches a time interval when input terminal receives the plurality of image units.

9. The image processing apparatus of claim 1, wherein the processing performed by the image processing unit on the plurality of image units comprises:

extracting an image portion in a temporally and spatially overlapped range from each of the plurality of image units;

connecting a temporally previous image portion and a temporally subsequent image portion of the image portions in the temporally and spatially overlapped range; and generating a loop image made up of the temporally previous image portion, temporally subsequent image portion, and the image portions that temporally and spatially continue between the temporally previous image portion and the temporally subsequent image portion as a processed subset of the plurality of image units.

10. The information processing apparatus of claim 9, further comprising:

generating images connected by overlapping each of the spatially continuous images with a spatially overlapped image portion, as the processed subset of the plurality of image units.

11. The information processing apparatus of claim 9, further comprising:

generating an image with which each of the temporally and/or spatially continuous images is overlapped, as the processed subset of the plurality of image units.

12. The image processing apparatus of claim 1, further comprising:

a first image memory unit that stores the plurality of image data units output from the input terminal.

13. The image processing apparatus of claim 12, further comprising:

a second image memory unit that stores the processed plurality of image units output by the image processing unit.

14. The image processing apparatus of claim 13, further comprising:

a control unit that controls the first image memory unit, the image processing unit, the second memory unit and the display image generating unit.

15. The image processing apparatus of claim 14, wherein the image processing unit, upon iteratively completing the image processing for each subset of the plurality of image units, outputs each processed subset of the plurality of image units to the second image memory unit.

16. The image processing apparatus of claim 15, wherein the image processing unit, upon iteratively completing the image processing for each subset of the plurality of image units, outputs a signal indicating completion of the image processing for each processed subset of the plurality of image units to the second image memory unit.

17. The image processing apparatus of claim 15, wherein the control unit controls the display image generating unit to acquire the plurality of image units from the first image memory unit for display when the processing of the image units for display has not been completed by the image processing unit.

18. The image processing apparatus of claim 15, wherein the control unit controls the display image generating unit to acquire the processed subset of the plurality of image units from the second image memory unit for display when the processing of the image units for display has been completed by the image processing unit.

19. An image display method performed by an information processing apparatus, the method comprising:

receiving, at an input terminal of the information processing apparatus, a plurality of image units that are temporally or spatially continuous;

performing image processing on the plurality of image units by iteratively performing the image processing on subsets of the plurality of image units;

displaying, by a display of the information processing apparatus, the plurality of image units upon beginning the image processing on the plurality of image units;

displaying, by the display, at a time of a completion of intermediate processing of a subset of the plurality of image units, an intermediate processed image including the processed subset of the plurality of image units; and displaying, by the display, after completion of the image processing of the plurality of image units, a complete processed image including the processed plurality of image units, wherein the processing performed on the plurality of image units includes extracting two similar image units having a minimum integral sum of absolute difference value from the plurality of image units, and a plurality of temporally continuous image units between the two similar image units;

taking a temporally previous image unit of the two similar image units as a first image unit, taking a temporally subsequent image unit as a rear-most image unit, and connecting the first image unit and rear-most image unit; and generating a loop image made up of the first image unit and rear-most image unit, and a plurality of temporally continuous image units between the first image unit and the rear-most image unit as a processed subset of the plurality of image units.

20. A non-transitory computer-readable medium including computer program instructions, which when executed by an information processing apparatus, cause the information processing apparatus to perform a method comprising:

receiving a plurality of image units that are temporally or spatially continuous;

performing image processing on the plurality of image units by iteratively performing the image processing on subsets of the plurality of image units;

displaying the plurality of image units upon beginning the image processing on the plurality of image units;

displaying, at a time of a completion of intermediate processing of a subset of the plurality of image units, an intermediate processed image including the processed subset of the plurality of image units; and displaying, after completion of the image processing of the plurality of image units, a complete processed image including the processed plurality of image units, wherein the processing performed on the plurality of image units includes extracting two similar image units having a minimum integral sum of absolute difference value from the plurality of image units, and a plurality of temporally continuous image units between the two similar image units;

taking a temporally previous image unit of the two similar image units as a first image unit, taking a temporally subsequent image unit as a rear-most image unit, and connecting the first image unit and rear-most image unit; and generating a loop image made up of the first image unit and rear-most image unit, and a plurality of temporally continuous image units between the first image unit and the rear-most image unit as a processed subset of the plurality of image units.

* * * * *